(12) United States Patent
Rimon et al.

(10) Patent No.: US 8,629,358 B2
(45) Date of Patent: Jan. 14, 2014

(54) METHOD FOR IDENTIFYING CHANGES IN SIGNAL FREQUENCIES EMITTED BY A STYLUS INTERACTING WITH A DIGITIZER SENSOR

(75) Inventors: Ori Rimon, Tel-Aviv (IL); Ariel Kerner, Herzlia (IL); Rina Weizman, Rechovot (IL)

(73) Assignee: N-trig Ltd., Kfar-Saba (IL)

( * ) Notice: Subject to any disclaimer, the term of this patent is extended or adjusted under 35 U.S.C. 154(b) by 828 days.

(21) Appl. No.: 12/232,811

(22) Filed: Sep. 24, 2008

(65) Prior Publication Data

US 2009/0078476 A1 Mar. 26, 2009

Related U.S. Application Data

(60) Provisional application No. 60/960,365, filed on Sep. 26, 2007.

(51) Int. Cl.
*G06F 3/041* (2006.01)

(52) U.S. Cl.
USPC .............. 178/18.03; 178/18.01; 178/18.07; 345/173; 345/179

(58) Field of Classification Search
USPC ...................................................... 178/18.03
See application file for complete search history.

(56) References Cited

U.S. PATENT DOCUMENTS

| | | | | |
|---|---|---|---|---|
| 5,220,324 A | * | 6/1993 | Morita | 341/32 |
| 5,748,110 A | * | 5/1998 | Sekizawa et al. | 341/5 |
| 5,751,229 A | | 5/1998 | Funahashi | |
| 5,986,646 A | * | 11/1999 | Chen et al. | 345/173 |
| 6,690,156 B1 | | 2/2004 | Weiner et al. | |
| 6,952,201 B2 | | 10/2005 | Fukushima et al. | |
| 7,292,229 B2 | | 11/2007 | Morag et al. | |
| 7,372,455 B2 | | 5/2008 | Perski et al. | |
| 2004/0095333 A1 | * | 5/2004 | Morag et al. | 345/173 |
| 2004/0169594 A1 | * | 9/2004 | Ely et al. | 341/22 |
| 2005/0171714 A1 | | 8/2005 | Ely et al. | |
| 2005/0189154 A1 | | 9/2005 | Perski et al. | |
| 2006/0012580 A1 | * | 1/2006 | Perski et al. | 345/173 |

(Continued)

FOREIGN PATENT DOCUMENTS

WO  WO 2009/040815  4/2009

OTHER PUBLICATIONS

Patents Act 1977: Examination Report Under Section 18(3) From the Intellectual Property Office of the United Kingdom Re. Application No. GB1006936.7.

(Continued)

*Primary Examiner* — Quan-Zhen Wang
*Assistant Examiner* — David Lee

(57) ABSTRACT

A method for dynamically updating at least one pre-defined value of a parameter used to identify at least one operational mode of an object for user interaction with a digitizer sensor during interaction with the digitizer sensor comprises detecting signal outputs from a plurality of sensing elements of a digitizer sensor during user interaction with the digitizer sensor; characterizing a pattern formed by the signal outputs from the plurality of sensing elements; identifying a pre-defined event associated with an operational mode of the object based on the pattern; determining a value of the parameter from the signal outputs in response to identification of the pre-defined event; and updating the pre-defined value used to identify the operational mode based on the value of the parameter determined from the identified event.

19 Claims, 11 Drawing Sheets

(56) References Cited

U.S. PATENT DOCUMENTS

2007/0085836 A1* 4/2007 Ely .............................. 345/173
2008/0128180 A1 6/2008 Perski et al.
2008/0158169 A1* 7/2008 O'Connor et al. ............ 345/173

OTHER PUBLICATIONS

Response Dated Mar. 2, 2011 to Examination Report Under Section 18(3) of Nov. 12, 2010 From the Intellectual Property Office of the United Kingdom Re. Application No. GB1006936.7.

International Preliminary Report on Patentability Dated Apr. 8, 2010 From the International Bureau of WIPO Re.: Application No. PCT/IL2008/001290.

International Search Report Dated Feb. 2, 2009 From the International Searching Authority Re.: Application No. PCT/IL2008/001290.

Written Opinion Dated Feb. 2, 2009 From the International Searching Authority Re.: Application No. PCT/IL2008/001290.

Examination Report Under Section 18(3) Dated Nov. 12, 2010 From the Intellectual Property Office of the United Kingdom Re. Application No. GB1006936.7.

Response Dated Oct. 28, 2010 to Patents Act 1977: Examination Report Under Section 18(3) of Jul. 1, 2010 From the Intellectual Property Office of the United Kingdom Re. Application No. GB1006936.7.

* cited by examiner

METHOD FOR IDENTIFYING CHANGES IN SIGNAL FREQUENCIES EMITTED BY A STYLUS INTERACTING WITH A DIGITIZER SENSOR

RELATED APPLICATION

The present application claims the benefit under section 35 U.S.C. §119(e) of U.S. Provisional Application No. 60/960,365 filed on Sep. 26, 2007 which is incorporated herein by reference in its entirety.

FIELD OF THE INVENTION

The present invention relates to a touch sensitive digitizer system, and more particularly to touch sensitive digitizer system having a passive stylus.

BACKGROUND OF THE INVENTION

Touch technologies are commonly used as input devices for a variety of products. The usage of touch devices of various kinds is growing sharply due to the emergence of new mobile devices such as Personal Digital Assistants (PDA), tablet PCs and wireless Flat Panel Display (FPD) screen displays. These new devices are usually not connected to standard keyboards, mice or like input devices, which are deemed to limit their mobility. Instead there is a tendency to use touch sensitive digitizers of one kind or another. A stylus and/or fingertip may be used as a user interaction.

U.S. Pat. No. 6,690,156 entitled "Physical Object Location Apparatus and Method and a Platform using the same" and U.S. Pat. No. 7,292,229 entitled "Transparent Digitizer" both of which are assigned to N-trig Ltd., the contents of both which are incorporated herein by reference, describe an electro magnetic method for locating physical objects on a FPD and a transparent digitizer that can be incorporated into an electronic device, typically over the active display screen. The digitizer sensor includes a matrix of vertical and horizontal conducting lines to sense an electric signal. Positioning the physical object at a specific location on the digitizer provokes a signal whose position of origin may be detected.

U.S. Pat. No. 7,292,229 further describes a passive electro magnetic stylus which is triggered by an excitation coil to oscillate at a resonant frequency. The oscillating signal is sensed by the digitizer. The stylus may operate in a number of different states including hovering, tip touching, right click mouse emulation, and erasing. The various states may be identified by dynamically controlling the resonant frequency of the stylus so that the stylus resonates at a different frequency in each state or by introducing different modulations to the oscillating signal for each state.

US Patent Application Publication No. 20080128180, entitled "Position Detecting System and Apparatuses and Methods for Use and Control Thereof" assigned to N-Trig Ltd., the contents of which is incorporated herein by reference, describes different embodiments for a stylus including a pressure sensitive stylus where the oscillation frequency of the stylus is modified depending on user applied pressure to the stylus.

U.S. Pat. No. 7,372,455, entitled "Touch Detection for a Digitizer" assigned to N-Trig Ltd., the contents of which is incorporated herein by reference, describes a detector for detecting both a stylus and touches by fingers or like body parts on a digitizer sensor. The detector typically includes a digitizer sensor with a grid of sensing conductors, a source of oscillating electrical energy at a predetermined frequency, and detection circuitry for detecting a capacitive influence on the sensing conductor when the oscillating electrical energy is applied, the capacitive influence being interpreted as a touch.

US Patent Application Publication No. 20050189154, entitled "Noise Reduction in Digitizer Sensor" assigned to N-Trig Ltd., the contents of which are incorporated herein by reference, describes a method for noise reduction in a digitizer, the digitizer comprising a plurality of detecting elements for detecting an electromagnetic signal at one of a number of predetermined frequencies. The detector can be used both for finger touch sensing and for detection of an electromagnetic stylus. In some embodiments described, the noise to be reduced originates from a finger or hand that is touching the digitizer during stylus detection. The method includes sampling at least two detecting elements substantially simultaneously to obtain outputs therefrom, and reducing the output on one of said two elements in accordance with the output on the other of said elements at a frequency other than a pre-determined frequency associated with the stylus.

SUMMARY OF THE INVENTION

An aspect of some embodiments of the invention is the provision of a method for dynamically determining signal frequencies associated with different operational modes of a passive stylus. According to some embodiments of the present invention, there is provided a method for dynamically determining signal frequencies associated hovering mode of a stylus while interacting with a digitizer sensor.

An aspect of some embodiments of the present invention is the provision of a method for dynamically updating at least one pre-defined value of a parameter used to identify at least one operational mode of an object for user interaction with a digitizer sensor during interaction with the digitizer sensor, the method comprising: detecting signal outputs from a plurality of sensing elements of a digitizer sensor during user interaction with the digitizer sensor; characterizing a pattern formed by the signal outputs from the plurality of sensing elements; identifying a pre-defined event associated with an operational mode of the object based on the pattern; determining a value of the parameter from the signal outputs in response to identification of the pre-defined event; and updating the pre-defined value used to identify the operational mode based on the value of the parameter determined from the identified event.

Optionally the method comprises identifying the operational mode of the object with the updated pre-defined value.

Optionally, the object is configured for operating in a plurality of operational modes.

Optionally, the plurality of operational modes is selected from a group including: hovering, tip touching, right mouse click emulation, and erasing.

Optionally, the pattern formed by the signal outputs is a pattern of signal amplitudes from the plurality of the sensing elements.

Optionally, the pattern of amplitudes is characterized by at least one ratio between amplitudes formed by the signal outputs.

Optionally, the ratio is a ratio between highest amplitude and signal output amplitude of at least one contiguous sensing element.

Optionally, identifying the pre-defined event includes comparing the at least one ratio to a pre-defined threshold.

Optionally, the operational mode associated with the pre-defined event is a hovering operational mode.

Optionally, the pre-defined event is hovering of the object above a pre-defined height from the digitizer sensor.

Optionally, the method comprises estimating a height of object above the digitizer sensor from the pattern of amplitudes.

Optionally, the height is a function of the at least one ratio and pre-defined coefficients.

Optionally, the method comprises determining at least two ratios between amplitudes formed by the signal outputs, wherein the at least two ratios are configured to resolve ambiguity between patterns of signal amplitudes that are a function of a height of the object above the digitizer sensor and patterns of signal amplitudes that are a function of a distance between a sensing element closest to the object and the position of the object on a surface of the digitizer sensor.

Optionally, the pre-defined event is hovering of the object between a first pre-defined minimum height and a second pre-defined maximum height above the digitizer sensor.

Optionally, identifying a predefined event includes determining the variance in the frequency of the signal outputs over a plurality of cycles of sampling the digitizer sensor outputs.

Optionally, the object is selected from a group including: stylus, token, and game piece.

Optionally, the parameter is the frequency of the signal outputs.

Optionally, the object includes a passive resonant circuit configured to transmit a signal in response to a triggering pulse.

Optionally, the resonant circuit is configured for resonating at a different frequency for each operational mode.

Optionally, the method comprises matching the triggering frequency of an excitation coil surrounding the digitizer sensor to an updated frequency value.

Optionally, the value of frequency used to identify that at least one operational mode is updated based on values of frequencies determined over a plurality of cycles of sampling the digitizer sensor outputs.

Optionally, the method comprises updating pre-defined values of the parameter used to identify other operational modes based on the determined value of the parameter determined in response to identification of the pre-defined event.

Optionally, the method comprises adjusting the change in the value required to switch between operational modes identification of the predefined event.

Optionally, the object includes a resonant circuit and at least one capacitor connected in parallel to the resonant circuit via a user controllable switch, and wherein an operational mode of the object is selected by activating the switch.

Optionally, the object is a pressure sensitive stylus sensitive to pressure applied to a tip of the stylus.

Optionally, the pressure sensitive stylus includes a resonant circuit, wherein the resonant circuit includes a variable element and wherein the element is varied in response to varying pressure applied on the tip of the stylus.

Optionally, each sensing element is associated with a position on the digitizer sensor.

Optionally, the sensing elements include a grid of conductive lines.

An aspect of some embodiments of the present invention is the provision of a method for identifying that an object configured for interacting with a digitizer sensor is hovering over the digitizer sensor, the method comprising: detecting the presence of object in the vicinity of the digitizer sensor from detected signal outputs obtained from a plurality of sensing elements of the digitizer sensor; determining at least one ratio between amplitudes of the signal outputs; and identifying that the object is hovering based on the at least one ratio.

Optionally, the at least one ratio is a ratio between the highest amplitude and amplitude of a signal output of at least one contiguous sensing element.

Optionally, the method comprises determining a height of the object above the digitizer sensor based on the pattern of amplitudes.

Optionally, the method comprises identifying hovering in response to the determined height.

Optionally, the method comprises identifying that the object is hovering for a height above a pre-defined minimum height.

Optionally, the method comprises identifying that the object is hovering for a height below a pre-defined maximum height.

Optionally, the height determined is a qualitative height.

Optionally, the qualitative measure for height includes low hovering, medium hovering and high hovering of the object.

Optionally, the height is a function of the at least one ratio and pre-defined coefficients.

Optionally, the method comprises determining at least two ratios between amplitudes formed by the signal outputs, wherein the at least two ratios are configured to resolve ambiguity between patterns of signal amplitudes that are a function of a height of the object above the digitizer sensor and patterns of signal amplitudes that are a function of a distance between a sensing element closest to the object and the position of the object on a surface of the digitizer sensor.

Optionally, the object is selected from a group including: stylus, token, and game piece.

Optionally, the object interacts with the digitizer sensor in a plurality of operational modes.

Optionally, the plurality of operational modes includes at least one of hovering operation mode, object touching operational mode, right mouse click emulation, and erasing.

Optionally, the object includes a passive resonant circuit configured to transmit a signal in response to a triggering pulse.

Optionally, the resonant circuit is configured for resonating at a different frequency for each operational mode.

Optionally, the object includes a resonant circuit and at least one capacitor connected in parallel to the resonant circuit via a user controllable switch, and wherein an operational mode of the object is selected by activating the switch.

Optionally, the object is a pressure sensitive stylus sensitive to pressure applied to a tip of the stylus.

Optionally, the pressure sensitive stylus includes a resonant circuit, wherein the resonant circuit includes a variable element and wherein the element is varied in response to varying pressure applied on the tip of the stylus.

Optionally, each sensing element is associated with a position on the digitizer sensor.

Optionally, the sensing elements include a grid of conductive lines.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
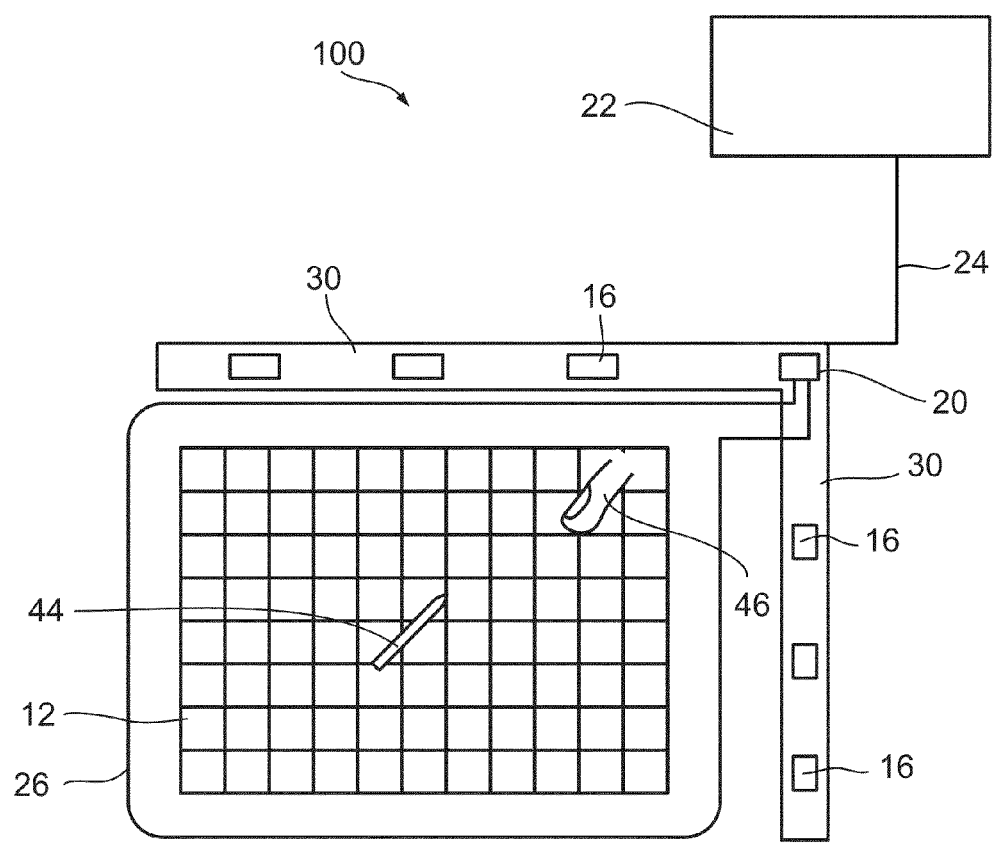
FIG. 1 shows a simplified block diagram of a digitizer system in accordance with some embodiments of the present invention.

The present invention relates to a touch sensitive digitizer system, and more particularly to touch sensitive digitizer system having a passive stylus.

An aspect of some embodiments of the present invention is the provision of methods for dynamically determining and adjusting the frequency used to identify each operational mode of a stylus. Operational modes may typically include, hovering, tip touching, right mouse click emulation and erasing. According to some embodiments of the present invention, the stylus is designed to resonate at unique predefined frequencies during each of its operation modes in response to an excitation signal. Signals transmitted by the stylus are picked by the digitizer sensor and deciphered to track the position of the stylus and determine its mode of operation. Typically, the mode of operation is determined based on the frequency of the signals picked up by the digitizer sensor, e.g. frequency of peak output. Typically, the excitation frequency used to trigger the stylus is updated based on the determined mode of operation to match the current resonant frequency of the stylus.

According to some embodiments of the present invention, the stylus is designed to change its frequency of transmission in response to pressure applied to the stylus tip e.g. during a tip touching operational mode, and/or in response to a user activating switches along the length of the stylus, e.g. during an erase operational mode. Mechanical and/or electrical changes that occur due to applying pressure on the tip and/or activating one or more switches alter the resonant circuit characteristics and thereby the resonant frequency output of the circuit in the stylus. A hovering mode of operation corresponds to a mode while no pressure is applied on the tip and no user activated switches are activated.

Typically, during manufacturing, the resonant frequency associated with each operational mode is determined, calibrated and recorded in the digitizer system's memory. Recorded frequencies are used to identify operational modes of a stylus during interaction with the digitizer sensor. However, the inventors have found that over time and with use, the resonant frequencies emitted by the stylus when operating at the different operation modes may change, e.g. drift. In some exemplary embodiments, characteristics of the resonant circuits may be altered due to mechanical wear in the stylus with use or due to environmental changes, e.g. changes in temperature and/or humidity.

The inventors have found that unpredicted changes in the emitted frequencies may lead to incorrectly identifying the operation mode of the stylus and thereby incorrectly interpreting user input to the host. For example mechanical wear and environmental changes (e.g. thermal changes) may lead to a stylus emitting a signal at a frequency originally defined for a tip touching operational mode while the stylus is actually hovering over the digitizer sensor.

An aspect of some embodiments of the present invention is the provision of methods for identifying at least one pre-defined event or state in an operational mode of the stylus and learning the frequency for that operation mode from output signals sampled during that identified event.

The inventors have found that an event where a stylus is hovering at a substantial height over a digitizing surface can be distinguished from events where the stylus is touching the digitizing surface and/or hovering close to the digitizing surface based on patterns formed from outputs obtained from conductive lines of a digitizer sensor. In some exemplary embodiments, the patterns are formed from signal amplitudes of the output. As used herein, the height of the stylus and/or the stylus tip refers to the distance between the digitizing surface and the stylus tip. The inventors have found that the pattern of signal amplitudes formed in response to a stylus tip touching the digitizer sensor and/or close to the digitizer sensor, is a sharp peak around the tip touch area while the pattern formed in response to a stylus hovering at pre-defined heights above the digitizer sensor, is a wider peak whose height is inversely related the height of the hovering, e.g. sharp peak for zero or low heights and shallow peak for heights above a pre-defined threshold.

According to some embodiments of the present invention, identification of the at least one event is based on detected patterns of signal amplitudes obtained from conductive lines of a digitizer sensor. In some exemplary embodiments, a pre-defined event includes a stylus hovering over a digitizer sensor at a height between two pre-defined thresholds. In some exemplary embodiments, a pre-defined event includes a stylus hovering over a digitizer sensor at a height above a pre-defined threshold.

According to some embodiments of the present invention, as the frequencies of the passive stylus drifts, methods that are not solely based on frequency detection are required to verify the operational mode of the stylus and determine an updated frequency associated with that mode. According to some embodiments of the present invention, once a pre-defined event is identified, the frequency of the output signals obtained for that event is detected and used to update the frequency of an operational mode associated with that event. According to embodiments of the present invention, operational modes of the stylus are detected from updated frequencies defined for at least one operational mode.

The inventors have found that changes in the resonant circuit characteristics typically have a global effect on all of the operational modes. So that if a frequency associated with a particular operational mode has been found to change, e.g. has shifted, that same shift can typically be applied to the frequencies associated with the other operational modes. Typically, frequency of the stylus signal for each operational mode is altered in relation to a defined hover frequency, so that if the hover frequency drifts in one direction, frequencies associated with other operational modes will also have a similar drift in that direction. Optionally, if a frequency associated with a particular operational mode has been found to change, e.g. has shifted, a relative shift which is proportional to the frequency can typically be applied to the frequencies associated with the other operational modes. As used herein, hover frequency is defined as the frequency transmitted by the stylus while no pressure is applied to the stylus tip and while no operational mode switch is activated.

An aspect of some embodiments of the present invention is the provision of methods for identifying an event or state in a hovering operational mode and updating frequencies associated with each of the operational mode based on the frequencies detected from signals obtained during the identified hover event. In some exemplary embodiments, the pre-defined frequencies for each of the operation modes are updated substantially continuously during operation of the digitizer sensor. In some exemplary embodiments, the pre-defined frequencies for each of the operation modes are updated periodically, e.g. at pre-defined time intervals during operation and/or once during start-up of the digitizer sensor.

According to some embodiments of the present invention, the hover event is identified based on a calculated height approximation of the stylus tip above the digitizer sensor. In some exemplary embodiments, height approximation is based on analysis of patterns of signal amplitudes outputs from a plurality of sensing elements of the digitizer sensor.

According to some embodiments of the present invention, values of ratios between magnitudes of signal output from a plurality of sensing elements are used as an indication of the height and width of a peak formed in response to the presence of a stylus. In some exemplary embodiments, a ratio is calculated between a sum of magnitudes obtained from a pre-defined number of sensing elements, e.g. 4 sensing elements, having the largest magnitudes and a sum total of magnitudes obtained from all sensing elements in a pre-defined area. According to some embodiments of the present invention, the ratio is associated with a height of the stylus above the digitizer sensor. In some exemplary embodiments, a height greater than zero, defines an event from which hover frequency can be detected. Typically, the sensing elements with the largest magnitude outputs are chosen from a common vicinity. Typically, the pre-defined area is the entire area of the digitizer sensor. In some exemplary embodiments a polynomial is defined relating hovering height to the calculated ratio. Typically, the coefficients of the polynomial are determined from statistically analysis of experimental results.

In some exemplary embodiments, two ratios are calculated and used to obtain approximation of both the hovering height and the position of the stylus on the digitizer sensor surface. A first ratio is between the highest magnitude output and the magnitude output from the closest contiguous sensing element, e.g. the closest sensing element to the left of the sensing element with the highest output. The second ratio is between two sensing elements closest to the sensing element with the highest output. In some exemplary embodiments, an estimated position and height is determined from the two ratios based on a looked up table constructed from experimental results. Typically, the look-up table is specific for each type of digitizer system and/or each type of stylus.

According to some embodiments of the present invention, a pre-defined event from which hover frequency can be determined is identified in response to the existence of a plurality of conditions. In some exemplary embodiments, the plurality of conditions requires that the ratio between the highest signal amplitude output and the second signal highest amplitude output is above a pre-defined threshold. In some exemplary embodiments, the plurality of conditions requires that the ratio between the highest signal amplitude output and the third highest signal amplitude output is above a pre-defined threshold. In some exemplary embodiments, the plurality of conditions requires that the highest signal amplitude output is above a predefined threshold.

The inventors have found that variance of frequency content of a hovering signal typically increases for hovering above a pre-defined threshold. This is typically attributed to accumulated noise, e.g. a lower Signal to Noise Ratio (SNR), associated with hovering heights above a pre-defined threshold. In some exemplary embodiments, the plurality of conditions requires that the variance of the frequency content of the hovering signal be below a pre-determined variance so that only hovering events below a pre-defined maximum height are used to learn an updated frequency associated with hovering. In some exemplary embodiments, the plurality of conditions requires that the frequency output of the detected signal does not stray from the pre-defined hover frequency more than a pre-defined amount.

According to some embodiments of the present invention, the hover frequency is updated with weighted averages of previously detected hover frequencies. According to some exemplary embodiments, a parameter indicating a confidence level that the current hover frequency is the true hover frequency is determined. In some exemplary embodiments, the confidence level is directly related to the number of frequency updates included in the weighted average. In some exemplary embodiments, the confidence level is implemented to define a change in detected frequency required to switch operational modes, e.g. switch between hover and tip touching operational mode. As used herein tip touching operation mode refers to an operational mode defined by the stylus' tip touching the digitizing surface. In some exemplary embodiments, tip touching operational mode may be referred to as object touching operational mode. In some exemplary embodiments, for high confidence levels, a relatively small change in frequency is enough to initiate a change in operational modes, e.g. 100 Hz. Lowering the change in frequency required makes the stylus more sensitive so that a small change in pressure applied to the stylus is enough to switch operational modes. In some exemplary embodiments, for low confidence levels, a relatively larger change in frequency is required to initiate a change in operational modes, e.g. 200 Hz. Increasing the change in detected frequency required makes the stylus less sensitive so that the stylus has to be lifted from the digitizer sensor by a significant amount to switch to hovering operational mode and/or a significant pressure needs to be applied to the stylus needs to switch to tip touching operational mode. Typically low and high confidence levels are determined by pre-defined thresholds.

The inventors have also found that as the resonant circuit characteristics of a passive stylus change, a mismatch between the excitation signal used to trigger the stylus and the resonant circuit frequency of the stylus may develop. As a result of this mismatch, energy delivered to the stylus is compromised and thereby the strength of the signal that can be transmitted by the stylus is reduced. In some exemplary embodiments, the excitation frequency used to trigger the stylus is updated based on the determined shifts in the frequencies associated the current operational mode. In some exemplary embodiments, the search frequency used for Discrete Fourier Transform (DFT) calculation is updated based on the determined shifts in the frequencies associated the current operational mode.

It is noted that although some embodiments of the present invention are described in reference to a pattern of signal amplitudes, in some exemplary embodiments, other patterns may be used to identify a pre-defined event, e.g. a pattern of phase output. It is also noted that although some embodiments of the present invention are described in reference to identifying a pre-defined hover event to update defined frequencies of operational modes, in some exemplary embodiments other events may be identified to update defined frequencies of operational modes, e.g. a pre-defined tilting of a user interaction. It is also noted that although some embodiments of the present invention are described in reference to a stylus user interaction, in some exemplary embodiments other objects may be used for user interaction, e.g. a token and/or a game piece. It is also noted that although some embodiments of the present invention are described in reference to identifying operational modes based on defined frequencies, the methods described herein can be applied to digitizer systems that identify operational modes of a user interaction by other methods, e.g. by phase output of a signal or amplitude of a signal.

Referring now to the drawings, FIG. 1 illustrating an exemplary simplified block diagram of a digitizer system in accordance with some embodiments of the present invention. The digitizer system 100 may be suitable for any computing device that enables interactions between a user and the device, e.g. mobile computing devices that include, for example, FPD screens. Examples of such devices include Tablet PCs, pen enabled laptop computers, tabletop computer, PDAs or any hand held devices such as palm pilots and mobile phones or other devices that facilitate electronic gaming. According to some embodiments of the present invention, the digitizer system comprises a sensor 12 including a patterned arrangement of conducting lines, which is optionally transparent, and which is typically overlaid on a FPD. Typically sensor 12 is a grid based sensor including horizontal and vertical conducting lines.

According to some embodiments of the present invention, circuitry is provided on one or more PCB(s) 30 positioned around sensor 12. According to some embodiments of the present invention PCB 30 is an 'L' shaped PCB. According to some embodiments of the present invention, one or more ASICs 16 positioned on PCB(s) 30 comprises circuitry to sample and process the sensor's output into a digital representation. The digital output signal is forwarded to a digital unit 20, e.g. digital ASIC unit also on PCB 30, for further digital processing. According to some embodiments of the present invention, digital unit 20 together with ASIC 16 serves as the controller of the digitizer system and/or has functionality of a controller and/or processor. Output from the digitizer sensor is forwarded to a host 22 via an interface 24 for processing by the operating system or any current application.

According to some embodiments of the present invention, digital unit 20 together with ASIC 16 includes memory and/or memory capability. Memory capability may include volatile and/or non-volatile memory, e.g. FLASH memory. In some embodiments of the present invention, the memory unit and/or memory capability, e.g. FLASH memory is a unit separate from the digital unit 20 but in communication with digital unit 20.

According to some embodiments of the present invention, sensor 12 comprises a grid of conductive lines made of conductive materials, optionally Indium Tin Oxide (ITO), patterned on a foil or glass substrate. The conductive lines and the foil are optionally transparent or are thin enough so that they do not substantially interfere with viewing an electronic display behind the lines. Typically, the grid is made of two layers, which are electrically insulated from each other. Typically, one of the layers contains a first set of equally spaced parallel conductors and the other layer contains a second set of equally spaced parallel conductors orthogonal to the first set. Typically, the parallel conductors are input to amplifiers included in ASIC 16. Optionally the amplifiers are differential amplifiers.

Typically, the parallel conductors are spaced at a distance of approximately 2-8 mm, e.g. 4 mm, depending on the size of the FPD and a desired resolution. Optionally the region between the grid lines is filled with a non-conducting material having optical characteristics similar to that of the (transparent) conducting lines, to mask the presence of the conducting lines. Optionally, the ends of the lines remote from the amplifiers are not connected so that the lines do not form loops.

Typically, ASIC 16 is connected to outputs of the various conductors in the grid and functions to process the received signals at a first processing stage. As indicated above, ASIC 16 typically includes an array of amplifiers, e.g. differential amplifiers, to amplify the sensor's signals. Additionally, ASIC 16 optionally includes one or more filters to remove frequencies that do not correspond to frequency ranges used for excitation and/or obtained from objects used for user interactions. Optionally, filtering is performed prior to sampling. The signal is then sampled by an A/D, optionally filtered by a digital filter and forwarded to digital ASIC unit 20, for further digital processing. Alternatively, the optional filtering is fully digital or fully analog.

According to some embodiments of the invention, digital unit 20 receives the sampled data from ASIC 16, reads the sampled data, processes it and determines and/or tracks the position of physical objects, such as a stylus 44, a finger 46, and/or an electronic tag touching the digitizer sensor from the received and processed signals. According to some embodiments of the present invention, digital unit 20 determines the presence and/or absence of physical objects, such as stylus 44, and/or finger 46 over time. In some exemplary embodiments of the present invention hovering of an object, e.g. stylus 44, finger 46 and hand, is also detected and processed by digital unit 20. According to some embodiments of the present invention, hovering and touching elements are differentiated by analysis of signal strength and/or signal frequency. Calculated position is sent to the host computer via interface 24.

According to some embodiments, digital unit 20 produces and controls the timing and sending of a triggering pulse to be provided to an excitation coil 26 that surrounds the sensor arrangement and the display screen. The excitation coil provides a trigger pulse in the form of an electric or electromagnetic field that excites passive circuitry in stylus 44 or other object used for user interaction to produce a response from the stylus that can subsequently be detected. Typically, to trigger a passive stylus, digital 20 provides a triggering pulse in a frequency that matches the resonant frequency of the stylus. According to some embodiments of the present invention, the frequency of the trigger pulse is updated in response to detected changes in the characteristics of circuitry in the stylus. Typically, the changes in the resonant frequency of the stylus circuit are small, so that a response from the stylus may still be achieved despite a mismatch between the frequency of the triggering pulse and the frequency of the stylus resonant circuit. Additionally, the excitation signal provided by the excitation coil typically includes side lobes so it includes a range of frequencies within a frequency band surrounding the frequency of the trigger pulse. Typically, the frequency output of the stylus is detected as the response to a triggering pulse decays so that the stylus is oscillating at its own resonant frequency as opposed to the resonant frequency of the excitation coil. Typically, a mismatch resonant frequency of the stylus may be detected within the frequency bandwidth of the stylus output. In some exemplary embodiments, the frequency output of the signal is detected by one or more of ASIC units 16 or digital unit 20 and updates to the frequency of the trigger pulse may be made based on the detected frequency.

According to some embodiments, digital unit 20 produces and sends a triggering pulse to at least one of the conductive lines. Typically the triggering pulses and/or signals are analog pulses and/or signals. According to some embodiments of the present invention, the triggering pulse and/or signal implemented may be confined to one or more pre-defined frequencies, e.g. 18 KHz or 20-40 KHz. In some exemplary embodiments, finger touch detection is facilitated when sending a triggering pulse to the conductive lines.

According to some embodiments of the invention, host 22 includes at least a memory unit 23 and a processing unit 25 to store and process information obtained from ASIC 16, digital unit 20. According to some embodiments of the present invention memory and processing functionality may be divided between any of host 22, digital unit 20, and/or ASIC 16 or may reside in only one of them and/or there may be a separated unit connected to at least one of host 22, digital unit 20, and ASIC 16. According to some embodiments of the present invention, one or more tables and/or databases may be stored to record statistical data and/or outputs, e.g. images or patterned outputs of sensor 12, sampled by ASIC 16 and/or calculated by digitizer unit 20. In some exemplary embodiments, a database statistical data from sampled output signals may be stored. Data and/or signal values may be stored in volatile and nonvolatile memory. According to some embodiments of the present invention, data and/or signal values may be stored as tables of spatial output of the digitizer sensor and/or differential amplifier output of the digitizer sensor. According to some embodiments of the present invention outputs are recorded after Discrete Fourier Transformation and/or filtering, e.g. after low pass and/or band-pass filtering.

Figure 2:
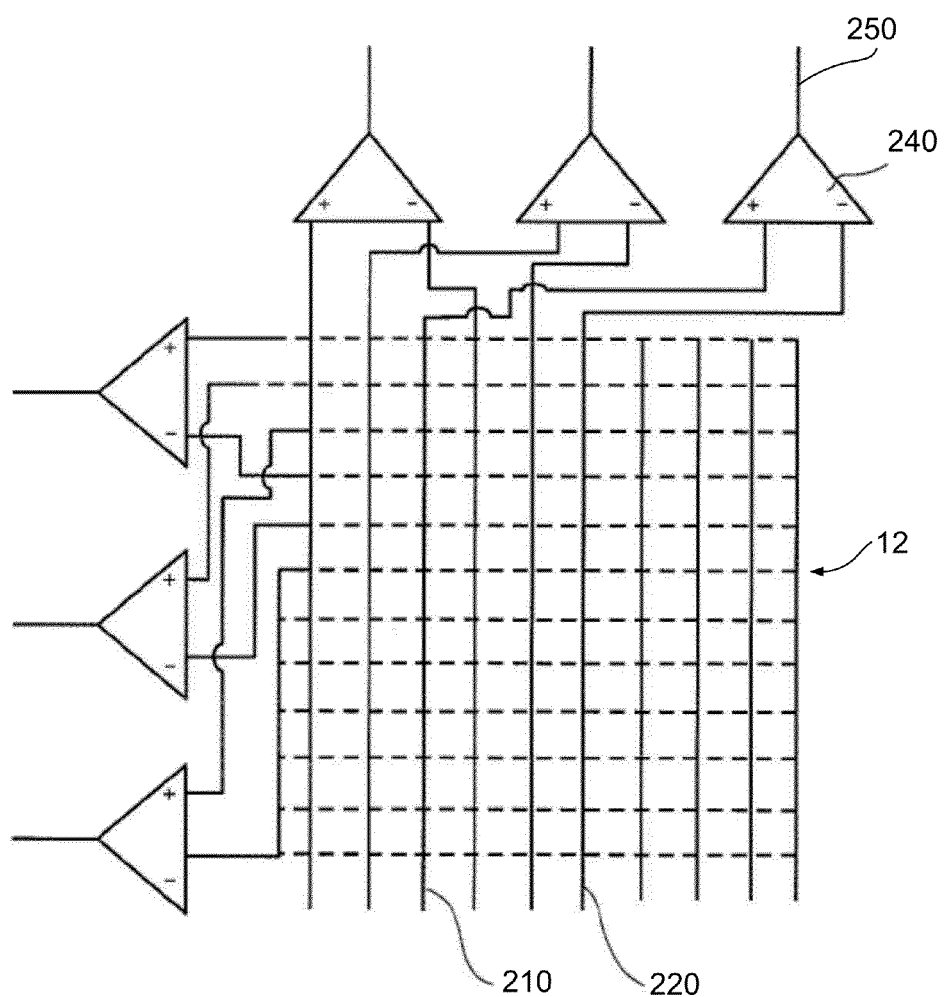
FIG. 2 shows a simplified diagram of pairs of conductive lines of a digitizer sensor that are input to a differential amplifier in accordance with some embodiments of the present invention.

Reference is now made to FIG. 2 showing a simplified diagram of pairs of conductive lines of a digitizer sensor that are input to a differential amplifier in accordance with some embodiments of the present invention. According to some embodiments of the present invention, parallel non-adjacent conductive lines 210 and 220 of sensor 12 are input to differential amplifier 240. According to some embodiments of the present invention, output 250 from a differential amplifier 240 is interrogated to determine if there is an input signal derived from touch and/or hovering on either of lines 210 and 220. Similarly, outputs of differential amplifiers associated with neighboring parallel lines and with orthogonal conductive lines of the grid are also interrogated. Typically, separation between two contiguous conductive lines may span between 1-6 mm and conductive lines 210 and 220 may typically be separated by at least two conductive lines positioned between them, e.g. 2-6 lines between them. The differential amplifier 240 amplifies the potential difference developed between conductive lines 210 and 220. ASIC 16 and digital unit 20 process the amplified signals from the conductive lines to identify a touch or hovering event occurring on one of the lines. According to some embodiments, differential amplifiers are used to diminish the affect of steady state signals that may appear in vicinities of the digitizer sensor.

Digitizer systems used to detect stylus and/or finger tip location may be, for example, similar to digitizer systems described in incorporated U.S. Pat. No. 6,690,156, U.S. Pat. No. 7,292,229 and/or U.S. Pat. No. 7,372,455. Additionally, styluses may be, for example, similar to styluses described in incorporated US Patent Application Publication No. 20080128180. Embodiments of the present invention will also be applicable to other digitizer systems known in the art, depending on their construction. Embodiments of the present invention will also be applicable to other digitizer sensors known in the art, e.g. sensors comprising loop coils.

Figure 3:
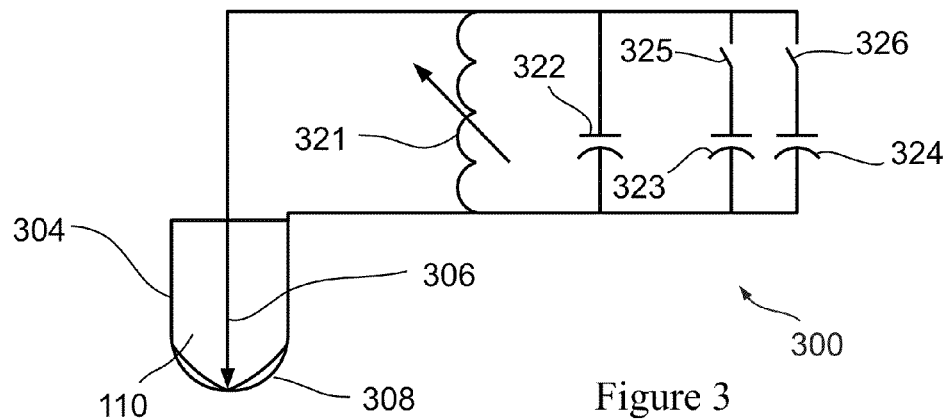
FIG. 3 shows a simplified circuit diagram of a pressure sensitive stylus capable of resonating at different frequencies in accordance with some embodiments of the present invention.

Reference is now made to FIG. 3 showing a simplified circuit diagram of a pressure sensitive stylus capable of resonating at different frequencies in accordance with some embodiments of the present invention. According to some embodiments of the present invention, the stylus 300 is a passive stylus including an inductor 321 and a 322 capacitor to form a basic resonant circuit from which stylus 300 is triggered. In some exemplary embodiments, inductor 321 is a variable inductor whose inductance is varied in response to pressure applied to the tip 306 of stylus 300. In response to pressure, inductance is altered so that the resonant frequency of the circuit may either increase or decrease. The varying capability of inductor 321 will be further described herein below, e.g. in reference to FIGS. 4A-4B. According to some embodiments of the present invention, stylus 300 includes additional capacitors 323 and 324 that are connected in parallel to capacitor 322 by one or more operational mode switches 325 and 326. Typically, switches 325 and 326 are manipulated by the user to select different modes of stylus operation, e.g. erasing and right click mouse emulation. In some exemplary embodiments, one or more switches positioned on a frame of stylus 300 are used to control switches 325 and 326. In some exemplary embodiments, a rocker switch is positioned on the frame and used to control switches 325 and 326. Optionally more than two capacitors are connected in parallel to capacitor 322 and additional operational modes are defined and controlled by an external switch, e.g. rocker switch. In response to activating one or more of switches 325 and 326, capacitors 323 and/or 324 introduce changes to the basic resonant circuit and thereby introduce changes to the resonant frequency of the circuit. Typically, the total capacitance of all capacitors connected to the circuit together with inductor 321 determines the resonance frequency of the resonance circuit so that stylus 300 has a unique resonant frequency for each operation mode. Typically, stylus 300 is passive and its resonant circuit oscillates in response to an excitation signal provided by an external source, e.g. excitation coil 26 that includes the resonant frequency of the stylus's circuit.

In some exemplary embodiments, one end of the resonant circuit is electrically connected to the stylus tip 306, which preferably comprises a conductive material while the other end is electrically connected to a frame 304, which likewise comprises conductive material. An electric field 308, synchronized to the resonant circuit oscillations, is formed in a gap 110 located between the tip 306 and the frame 304. The geometric dimensions of the gap and the consequent field are relatively small so that the field source can be substantially close to the stylus tip and thereby provide a concentrated signal at the tip.

Figure 4A:
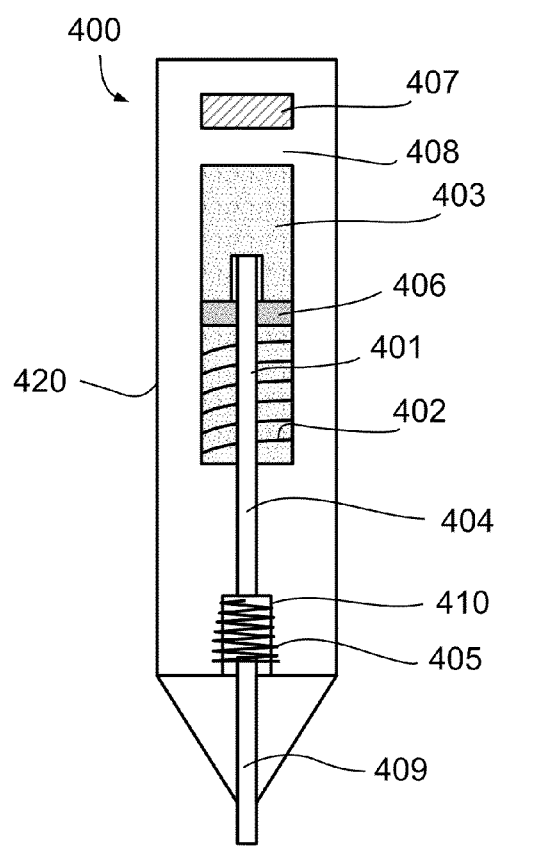
FIGS. 4A and 4B show simplified block diagrams of two exemplary mechanical structures for a pressure sensitive stylus in accordance with some embodiments of the present invention.
Figure 4B:
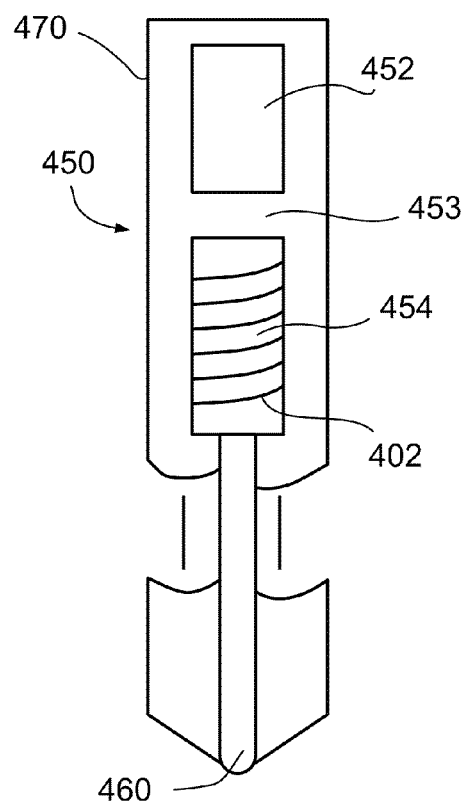

Reference is now made to FIGS. 4A-4B showing simplified block diagrams of two exemplary mechanical structure for a pressure sensitive stylus in accordance with some embodiments of the present invention. In FIG. 4A, stylus 400 includes a frame 420 with a tip 409 that is movable in the direction of its longitudinal axis. In some exemplary embodiment, a first end of a rod 404 is secured to movable tip 409 via holder body 410 and a spring 405. In some exemplary embodiments, spring 405 is positioned around holder body 410 and secured to frame 420 to apply a spring force on tip 409. Optionally, a mechanical stopper is positioned at one end of the spring to prevent application of pressure that is out of the dynamic range that can be sensed by the digitizer.

According to some embodiments of the present invention, a first ferrite object 401 is fixed to a frame 420 substantially surrounds rod 404. In some exemplary embodiments, first ferrite object 401 is a cylindrical object including a bore through which rod 404 is positioned. Typically, a coil 402 providing inductance to resonant circuit 300 is wounded around first ferrite object 401. According to embodiments of the present invention, coil 402 serves as a receiving coil that picks up currents induced by external excitation coil 26 creating a magnetic field. The presence of ferrite object 401 serves to increase energy transfer between the external excitation coil 26 and coil 402 by strengthening the magnetic field. According to some embodiments of the present invention, a second ferrite object 403 is secured over a second end of rod 404 so that second ferrite object 403 together with rod 404 is movable with respect to first ferrite object 401. According to some embodiments of the present invention, the varying inductance 321 provided by coil 402 is a function of the distance between the first and second ferrite objects. Typically, the presence of second ferrite object within the magnetic field produced by coil 402, serves to reduce the length of the magnetic field lines created by coil 402 and thereby increase the inductance. This effect is increased as the second ferrite object approaches coil 402 and first ferrite object 401 and is decreased as the second ferrite object is distanced from coil 402 and first ferrite object 401.

In operation, while pressure is applied to tip 409, second ferrite object 403 is distanced from first ferrite object 401. As the user applies pressure on tip 409 and overcomes the force applied by the spring, second ferrite object 403 moves along the axis of the tip 409 and rod 404 in a direction away from first ferrite object 401, reducing the inductance. In some exemplary embodiments, the spring applies a force of approximately 5 to 15 gram-force along the axis of the rod so that the first and second ferrite are held together while no pressure is applied to the tip. Optionally, a spacer 406 is positioned between the two ferrite objects to form a predetermined gap between them when no pressure is applied. In some exemplary embodiments, the spacer providing a gap of approximately 50 to 150 μm is used. Optionally, spring 405 and/or holder body 410 is manufactured from conductive material and is used to transmit the signal from the resonant circuit to tip 409.

In some exemplary embodiments, the inductance value varies by several mH due to the change in gap size. The change in inductance results in a change in the frequency of the signal transmitted by the tip. In some exemplary embodiments, the resonant frequency increases as a function of increasing pressure.

In some exemplary embodiments, an elastic body 407, e.g. an O-ring is positioned in between second ferrite object 403 and frame 420, e.g. on housing 420 in an opposite end from tip 409. In some exemplary embodiments, a gap 408 of approximately 10-30 μm is formed between elastic body 407 and second ferrite object 403 in an initial state when there is no pressure applied on tip 409. As the user applies pressure on tip 409, elastic body 407 engages second ferrite object 403 and applies a force in a direction opposite a pressure applied by a user on tip 409. Typically, as the a user increase pressure on tip 409, the resistance applied by elastic body 407 increases due to an increase in surface area of elastic body contacting second ferrite body 403.

In some exemplary embodiment, the change in frequency due to changes in inductance ranges approximately between 100-200 Hz so that a difference between the frequency when no pressure is applied and a frequency when pressure is applied ranges between 100-200 Hz.

In FIG. 4B, stylus 450 includes a first ferrite object 454 that is secured to a tip 460 and moves together with tip 460 along its longitudinal axis. Typically, a coil 402 providing inductance to resonant circuit 300 is wounded around first ferrite object 454. A second ferrite object 452 is stationary with respect to frame 470 and is positioned with so that a gap 453 is formed between the first and second ferrite objects while no pressure is applied to tip 460. During operation, while a user applies pressure to tip 460, ferrite object 454 approaches second ferrite object 452 and gap 453 between them decreases. The decrease in gap 453 leads to an increase in inductance and thereby a decrease in the resonant frequency transmitted. In some exemplary embodiments, the resonant frequency decreases as a function of increasing pressure. In some exemplary embodiments, the inductance values may vary by several 0.1 mH. Optionally, changes in inductances and resonant frequency may be similar to changes in frequency described in reference to FIG. 4A.

According to some embodiments of the present invention, during manufacturing, frequencies emitted by the stylus for each of the operational modes are calibrated and the frequency values are stored in the digitizer system's memory for reference. In some exemplary embodiments, a frequency corresponding to a hovering operational mode is set at 28 KHz or 29 KHz while tip touch mode is set at 200 Hz below or above hover mode, depending on the configuration of the stylus used. In some exemplary embodiments, for systems operating with a stylus similar to stylus 400, tip touch mode is set at 200 Hz above hover mode while for systems operating with a stylus similar to stylus 450, tip touch mode is set at 200 Hz below hover mode. During operation, the different modes of operation may be identified based on frequency of a signal picked up from the digitizer sensor.

According to some embodiments of the present invention, while the presence of a stylus has not been detected, e.g. at a system start-up, the digitizer system operates in a search mode to search for a stylus interacting with the digitizer sensor. During a search mode, excitation coil 26 emits trigger pulses and/or oscillates in a plurality of frequencies including the frequencies corresponding to the different operational modes of the stylus. According to some embodiments, of the present invention, once the stylus is detected, the frequency of the peak output is determined and the operational mode is identified. According to some embodiments of the present invention, once the stylus is deed and the operational mode is identified, the digitizer system switches to tracking mode and digital unit 20, triggers excitation coil 26 at the resonant frequency corresponding to the identified operational mode. According to some embodiments of the present invention, the digitizer system tracks the position of the stylus during tracking mode using the triggering frequency corresponding to the resonant frequency of the stylus for that mode to obtain output. According to some embodiments of the present invention, the system returns to search mode when the presence of the stylus is lost. In some exemplary embodiments, the presence of the stylus is lost in response to a change in the operational mode of the stylus.

According to some embodiments of the present invention, during operation of the digitizer system, the digitizer system also tracks any drift in hover frequency and updates frequencies associated with each of the operational modes of the stylus based on a detected hover frequency when required. As used herein, hover frequency is defined as the frequency transmitted by the stylus while no pressure is applied to the stylus tip and while no operational mode switch is activated, e.g. while switches 325 and 326 are not closed. It is noted that according to embodiments of the present invention, the normal state of switches 325 and 326 may be open or closed. Typically, a hovering operational mode needs to be identified before changes in hover frequency can be identified. However, since the current hover frequency is not known to the system, it is not possible to verify that the stylus is in hovering operational mode based only on the frequency of the detected signal. According to some embodiments of the present invention, other characteristics of a detected signal are used to verify that the stylus is in a hovering operational mode and to verify that the detected hover signal is suitable for tracking a change in hover frequency.

Figure 5:
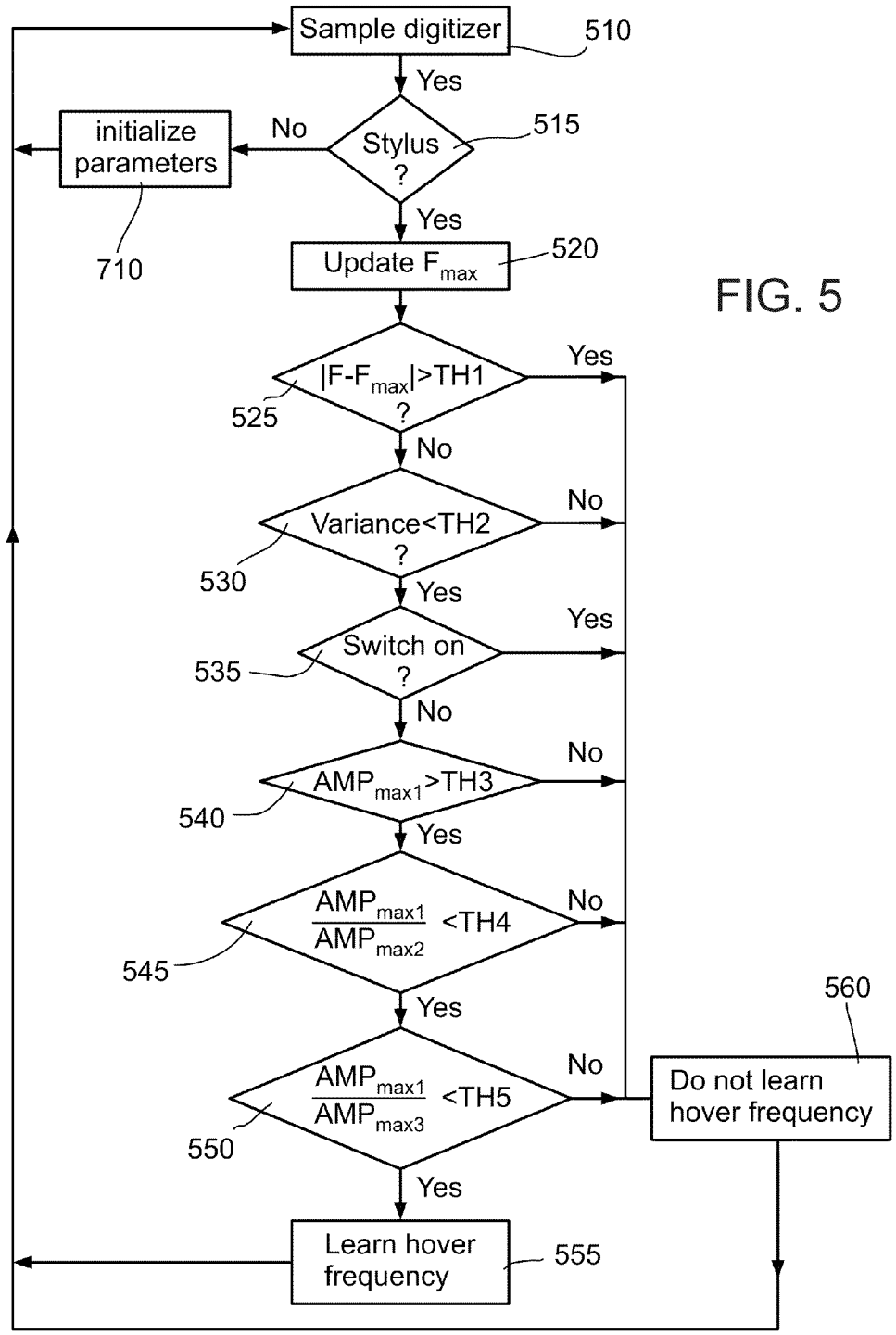
FIG. 5 shows an exemplary flow chart of a method for selecting a signal during user interaction with the stylus from which an updated hover frequency can be determined in accordance with some embodiments of the present invention.

Reference is now made to FIG. 5 showing an exemplary flow chart of a method for selecting a signal during user interaction with the stylus from which an updated hover frequency can be determined in accordance with some embodiments of the present invention. Upon start-up of the digitizer system, the digitizer sensor is sampled (block 510) and a query is made to determine if a stylus is in the vicinity of the digitizer sensor (block 515). Typically, presence of a stylus is detected in search mode. According to some embodiments of the present invention, a stylus is determined to be in the vicinity of the digitizer sensor if one or more digitizer sensor outputs are above a predefined threshold for determining the presence of a stylus.

Figure 7:
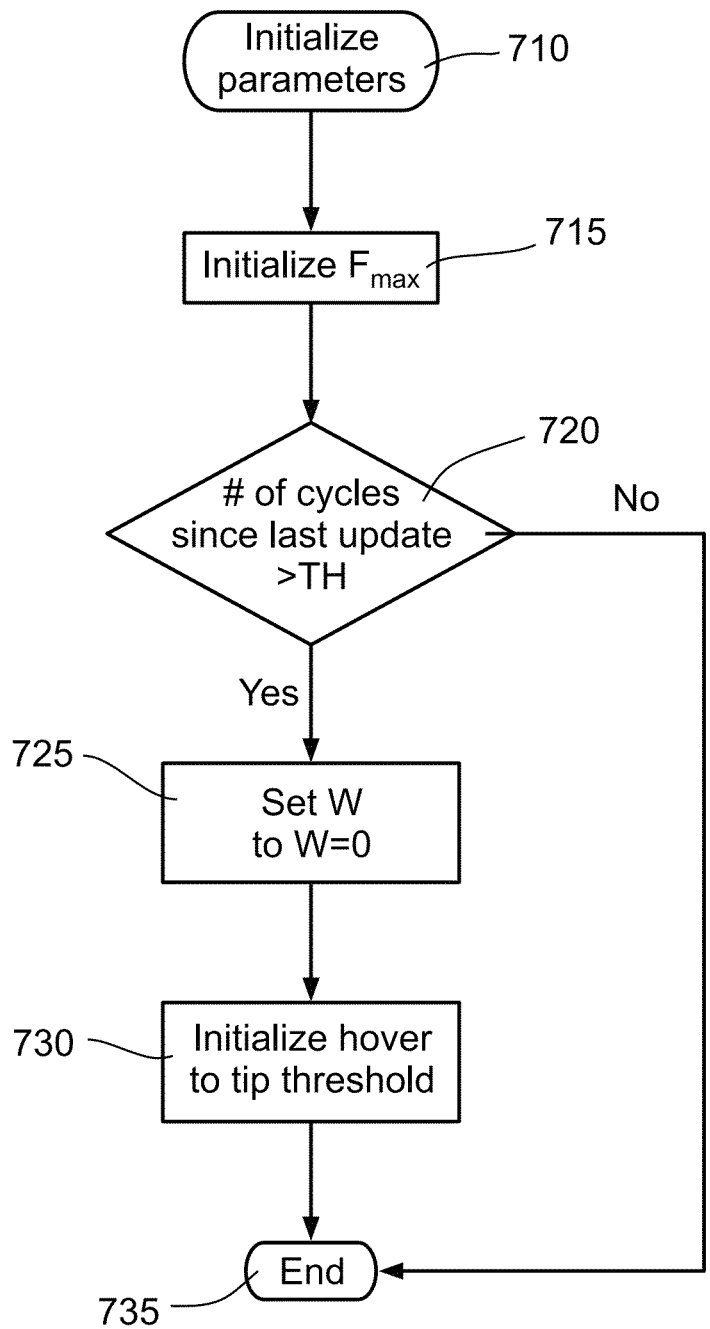
FIG. 7 shows an exemplary flow chart of a method for initializing update parameters in the absence of a stylus event in accordance with some embodiments of the present invention.

According to some embodiments of the present invention, if the presence of a stylus is not determined, hover frequency update parameters are initialized (block 710) as is further described herein, e.g. in reference to FIG. 7. According to some embodiments of the present invention, if the presence of a stylus is determined, a pre-defined upper limit on frequencies of detected signals, $F_{max}$, is checked for updates (block 520). According to some embodiments of the present invention, an upper limit on frequencies of detected signals is determined for digitizer systems using stylus' similar to stylus 450 where hover frequency constitutes the operational mode with the highest frequency. However, it is noted that similar methods described herein can be used for stylus' similar to stylus 400 by defining and updating a lower limit on frequencies of detected signals, $F_{min}$ instead of an upper limit. This is because for stylus' similar to stylus 400, hover frequency constitutes the operational mode with the lowest frequency.

According to some embodiments of the present invention, a maximum frequency in the detected signal is determined and compared with a previously defined $F_{max}$, e.g. an $F_{max}$ defined and stored at the manufacturing site, and if the maximum frequency currently detected is found to be greater than $F_{max}$, $F_{max}$ is updated to the current maximum frequency. Fmax is defined as the maximum frequency ever detected in the system since last reset of the system. According to some embodiments of the present invention, $F_{max}$ is determined to limit the possible frequency that can be associated with hovering.

In some exemplary embodiments, the system detects a presence of finger and/or palm touch prior to updating $F_{max}$. In some exemplary embodiments, if a finger and/or a palm are detected, $F_{max}$ is not updated. In some exemplary embodiments, if a finger and/or a palm are detected, a noise reduction algorithm is run to remove influences of finger and/or palm touch and $F_{max}$ is updated only if the algorithm can remove the influences of finger and/or palm touch. In some exemplary embodiments, the noise reduction algorithm is similar to that described in incorporated US Patent Application Publication No. 20050189154. In some exemplary embodiments, $F_{max}$ is only updated if the magnitude of the signal from which $F_{max}$ was detected is above a pre-defined threshold for updating $F_{max}$.

According to some embodiments of the present invention, a query is made to determine if the current maximum frequency of the signals detected differs from $F_{max}$ by a more than a pre-defined threshold, TH1 (block 525). In some exemplary embodiments, for a difference in current maximum frequency below a pre-defined threshold from $F_{max}$, it is suspected that the stylus is not in hover mode and the signals are not accepted for learning a new hover frequency (block 560). However, if the difference in $F_{max}$ is below the pre-defined threshold, additional conditions are queried to determine if the signals are suitable for learning a new hover frequency.

The present inventors have found that variance of frequency content of a hover signal increases for hovering above a pre-defined threshold. This is typically attributed to accumulated noise, e.g. a lower Signal to Noise Ratio (SNR), associated with hovering heights above a pre-defined threshold. According to embodiments of the present invention, hovering events above a pre-defined threshold are not used for updating frequency defined for hovering operational modes. According to some embodiments of the present invention, the frequency variance of one or more detected signals from the digitizer sensor is checked against a threshold and only if the signals are found to have a variance below the pre-defined threshold, TH2 the signals accepted as potential signals for learning a new hover frequency (block 530). In some exemplary embodiments, the output with the highest magnitude is queried for this purpose. In some exemplary embodiments, the outputs with three of hour highest magnitudes are queried for this purpose.

According to some embodiments of the present invention, an additional query is made to determine if one or more of the operational mode switches are activated (block 535). In some exemplary embodiment the detected signals are only accepted as potential signals for learning a new hover frequency if all switches are off, e.g. not activated.

According to some embodiments of the invention, the maximum amplitude of the detected signals are compared to a pre-defined threshold and only if the maximum amplitude detected is above a pre-defined threshold, are the signals considered as a potential signal for learning a new hover frequency (block 540).

According to some embodiments of the present invention, ratios between different outputs of the sensor are determined and compared to thresholds to determine if a pattern of signal outputs obtained from the digitizer is typical of patterns obtained during a hovering event where the stylus is hovering above a pre-defined height. The present inventors have found that during hovering above a pre-defined height, the peak in the amplitude pattern formed by output from the digitizer sensor is typically shallower and wider as compared to the peak formed during tip touch of the stylus tip and/or lower hovering. According to some embodiments of the present invention, a hovering event where the stylus is hovering above a predefined height is identified by determining attributes of the peak in the amplitude pattern formed by output from the digitizer sensor. According to some embodiments of the present invention, one or more parameters are defined to determine a qualitative and/or quantitative measure of the height and width of the peak in the amplitude pattern formed by output from the digitizer sensor. According to embodiments of the present invention, a hovering event where the stylus is hovering above a pre-defined height is detected based on values of the defined parameters.

According to some embodiments of the present invention, a ratio between the maximum amplitude output and the second highest amplitude output is compared to a pre-defined threshold, TH4 (block 545). In some exemplary embodiments, TH4 is 5-20, e.g. 10. According to some embodiments of the present invention, for ratios smaller than the pre-defined threshold, the signals are determined as potential signals for learning hover frequency. In some exemplary embodiments, the maximum and second highest outputs are required to be obtained from a same vicinity in the digitizer sensor, e.g. obtained from conductive lines that are within 1-5 lines apart.

According to some embodiments of the present invention, an additional condition includes that a ratio between the maximum amplitude output and the third highest amplitude output is below a pre-defined threshold, TH5 (block 550). In some exemplary embodiments, the maximum and third highest outputs are required to be obtained from a same vicinity in the digitizer sensor, e.g. obtained from conductive lines that are within 1-5 lines apart.

According to some embodiments of the present invention, if all the conditions for determining that the detected signals are potential signals for learning hover frequency are met, an updated hover frequency, $F_{hover}$, is determined based on the detected signals (block 555). According to some embodiments of the present invention, if one or more of the defined conditions are not met, hover frequency is not updated during this sampling cycle (block 560). In some exemplary embodiments of the present invention, this cycle is repeated for each set of outputs sampled from the digitizer sensor. In some exemplary embodiments, this cycle is repeated once for every pre-defined number of cycles.

Figure 6:
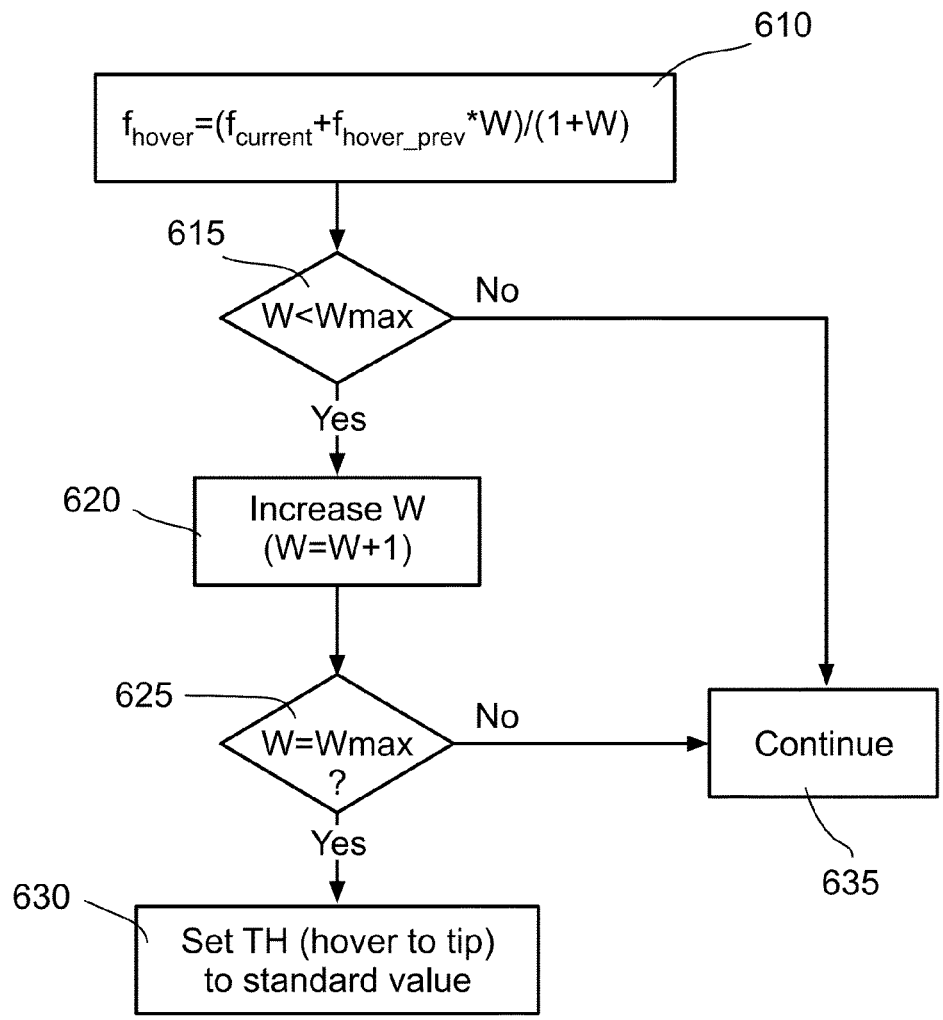
FIG. 6 shows an exemplary flow chart of a method for dynamically updating hover frequency in accordance with some embodiments of the present invention.

Reference is now made to FIG. 6 showing an exemplary flow chart of a method for dynamically updating hover frequency in accordance with some embodiments of the present invention. According to some embodiments of the present invention, hover frequency is updated based on weighted averages with previously defined hover frequencies using the following relationship:

$$F_{hover}=(F_{current}+F_{hover\_prev}*W)/(1+W);$$

Where W equals the number of updates made since system start-up and/or since detection of the presence of the stylus (block 610); $F_{current}$ is the frequency detected for the currently identified hover signal output; and $F_{hover\_prev}$ is the previously defined frequency for hover. Typically, $F_{current}$ is defined as the frequency corresponding to the peak signal output for the currently identified hover signal output. As W increases, e.g. the number of updates made increases, the weight of the previous updates increases thereby stabilizing $F_{hover}$. In some exemplary embodiments, as W increases the confidence level that the defined hover frequency is a true hover frequency is increased. If W is less than a pre-defined maximum value $W_{max}$ (block 615), W is incremented (block 620) and a query is made to determine if $W_{max}$ has been reached (block 625). In some exemplary embodiments, $W_{max}$ is set between 8-12, e.g. 10. According to some embodiments of the present invention, when W reaches $W_{max}$, the confidence level that the defined hover frequency is a true hover frequency is high and as a result the change in frequency threshold required for switching between a hover mode and a tip touching operational mode is reduced (block 630). In some exemplary embodiments, the frequency threshold required for switching between a hover mode and a tip touching operational mode for high confidence levels of hover frequency is approximately 100 Hz while the threshold required during low confidence levels is approximately 200 Hz. According to some embodiments of the present invention, while a hover event has been identified with a low confidence level more pressure on the tip is required before a tip touching operational mode is identified making the system less sensitive to changes between hover and tip touch. According to some embodiments of the present invention, while a hover event been identified with a high confidence level, less pressure on the tip is required for a tip touching operational mode to be identified making the system more sensitive to changes between hover and tip touch. Typically, the frequency threshold required for switching between a hover mode and a tip touching operational mode is determined based on the mechanical structure and/or circuitry of the stylus. In some exemplary embodiments, once W reaches is maximum value (block 635), hover frequency is not updated. In some exemplary embodiments, W is set to 0 after a pre-defined number of cycles, in response to a system start-up, and/or after the presence of the stylus is lost.

Reference is now made to FIG. 7 showing an exemplary flow chart of a method for initializing update parameters in the absence of a stylus event in accordance with some embodiments of the present invention. According to some embodiments of the present invention, when the presence of a stylus is not detected, parameters for hover frequency update are initialized (block 710). In some exemplary embodiments, $F_{max}$ is initiated to its original value, e.g. its value set during calibration at a manufacturing site (block 715). In some exemplary embodiments, the original value of $F_{max}$ is defined as 28 KHz and/or 29 KHz. In some exemplary embodiments, the original value of $F_{max}$ is defined as 28 KHz when the frequency for tip touching operational mode is defined to be lower than hovering operational mode. In some exemplary embodiments, the original value of $F_{min}$ is defined as 29 KHz when the frequency for tip touching operational mode is defined to be higher than hovering operational mode. In some exemplary embodiments, initializing $F_{max}$ serves to avoid accumulated error and/or to accommodate introduction of a stylus other than the stylus previously used.

In some exemplary embodiments, a query is made to determine the number of sampling cycles since hover frequency has been updated (block 720). If the number of cycles since the last update exceeds a pre-defined threshold, e.g. a threshold of approximately 50 cycles, parameter W is set to zero (block 725) and the hover to tip threshold is initialized to its low confidence level (block 730). According to some embodiments of the present invention, the sampling of the digitizer sensor continues with initialized parameters as described in reference to FIG. 5.

Figure 8:
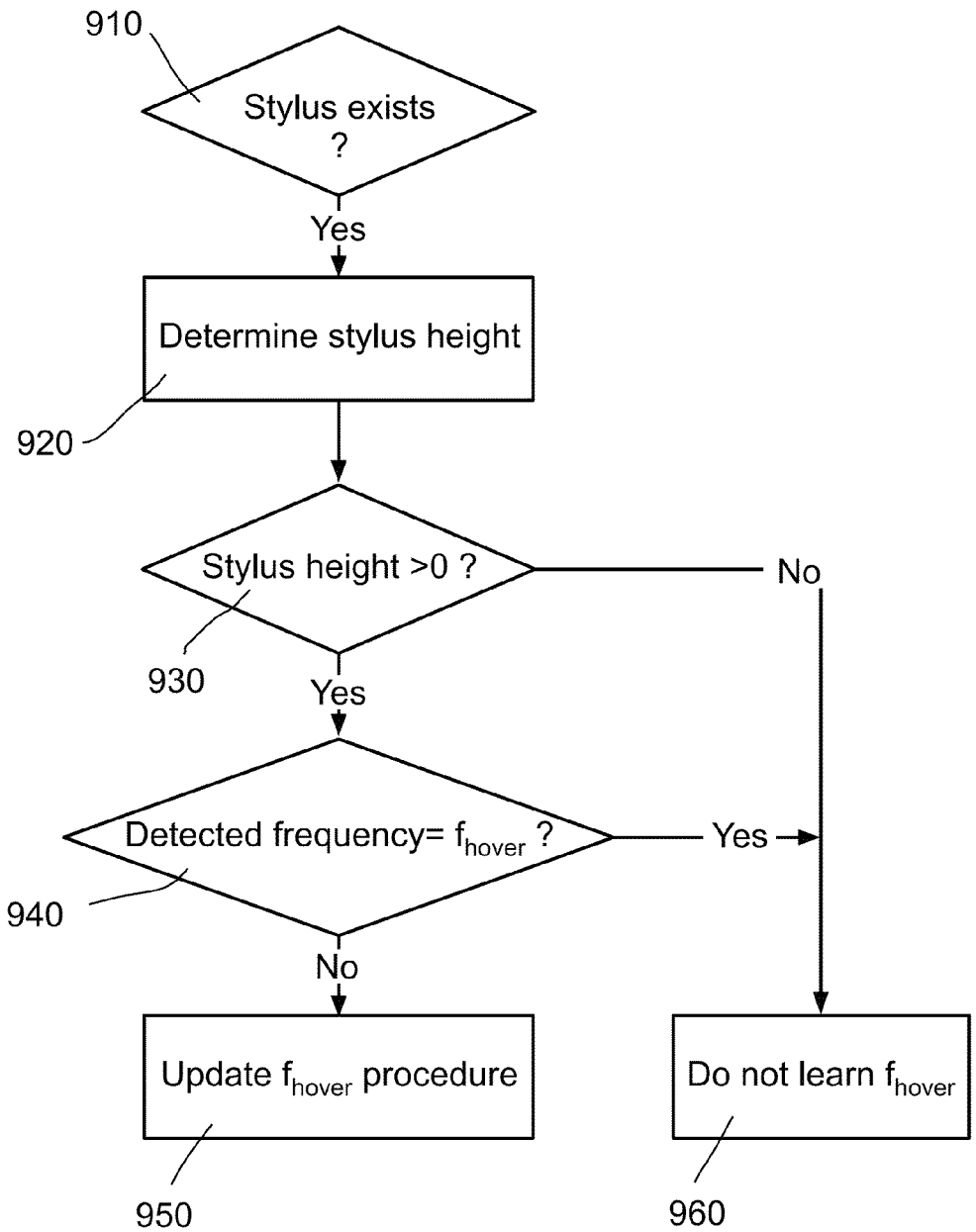
FIG. 8 shows an exemplary flow chart of a method for updating frequency associated with hover in response to detected height of stylus in accordance with some embodiments of the present invention.

According to some embodiments of the present invention, a method for determining that output signals from a digitizer sensor results from a hovering event where the stylus is hovering above a pre-defined height includes determining a height of a stylus above the digitizer sensor based on analysis of a pattern of signal amplitudes obtained from the digitizer sensor. Reference is now made to FIG. 8 showing an exemplary flow chart of a method for updating frequency associated with hover in response to detected height of stylus in accordance with some embodiments of the present invention. According to some embodiments of the present invention, upon start-up of the system, a query is made to determine if a stylus is present in the vicinity of the digitizer system (block 910). If a stylus is present, the height of the stylus above the digitizer sensor is calculated (block 920). In some exemplary embodiments, the height determined is qualitative, e.g. high, medium, or low. In other exemplary embodiments, the height determined is quantitative, e.g. measured in mm above digitizer sensor. If the stylus height is determined to be greater than zero and/or greater than a predefined threshold (block 930), the frequency of the detected signal is compared to a previously defined hover frequency (block 940). If the hover frequency is other than the previously defined hover frequency, the define hover frequency is updated (block 950). Otherwise the previously defined hover frequency is maintained (block 960) and the cycle is repeated for a subsequent sample. In some exemplary embodiments, hover frequency is updated based on the methods described in reference to FIG. 6. In some exemplary embodiments, the threshold for stylus height is set at a value above zero, e.g. 1-2 mm, to avoid errors in hover detection at low hover levels. In some exemplary embodiments, the threshold for stylus height is set at a value above zero, e.g. 1-2 mm for low confidence levels of hover frequency and set at zero for high confidence levels of hover frequency.

Figure 9A:
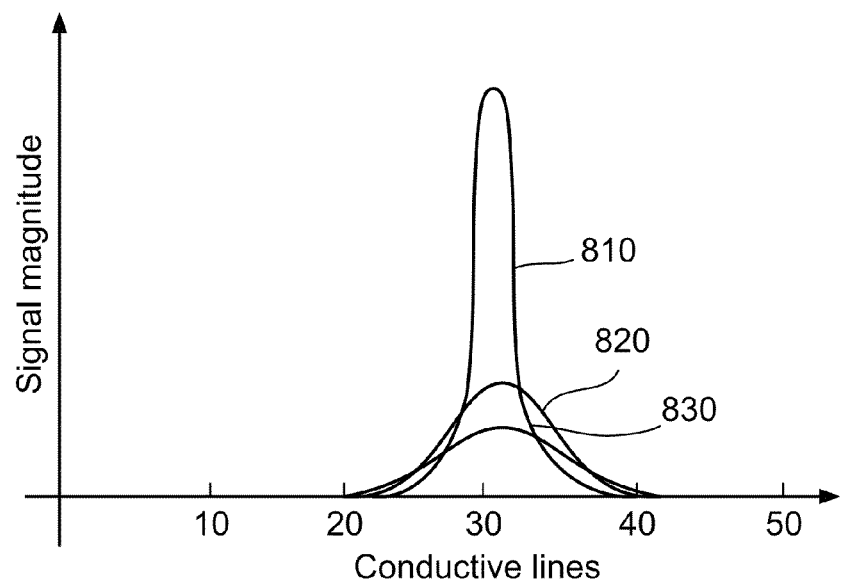
FIG. 9A shows simplified patterns of signal magnitudes corresponding to hovering at different heights in accordance with some embodiments of the present invention.

Reference is now made to FIG. 9A showing simplified patterns of signal magnitudes corresponding to hovering at different heights in accordance with some embodiments of the present invention. The pattern of signal magnitudes shown in FIG. 9A correspond to expected outputs from individual conductive lines as opposed to outputs from differential amplifiers described in FIG. 2. According to some embodiments of the present invention, pattern 810 corresponds to a stylus tip touch in the vicinity of the $30^{th}$ conductive line, while pattern 820 and 830 correspond to a stylus hovering over a digitizer at a medium height, e.g. 8-10 mm above digitizer sensor, and a low height respectively, 3-5 mm above digitizer sensor.

Figure 9B:
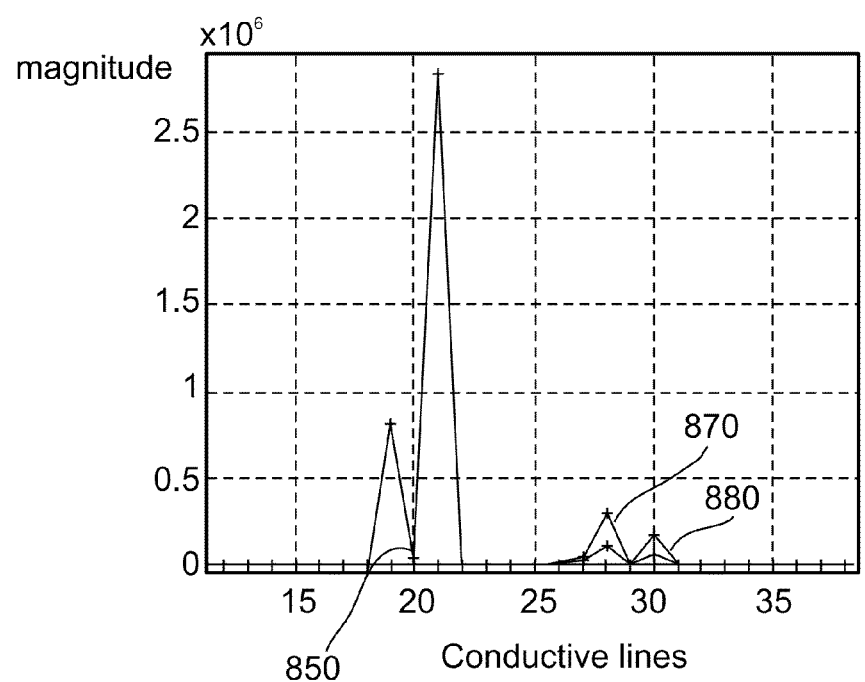
FIG. 9B shows simplified patterns of signal magnitudes obtained from differential amplifiers connected to pairs of conductive lines, the patterns corresponding to hovering at different heights in accordance with some embodiments of the present invention.

Reference is now made to FIG. 9B showing similar patterns of signal magnitudes corresponding to hovering at different heights obtained from outputs of a differential amplifier according to some embodiments of the present invention. In some exemplary embodiments, outputs from differential amplifiers may typically include a dip, e.g. dip 850, in a peak amplitude pattern, due to canceling out of a signal appearing on both inputs to the same differential amplifier. In FIG. 9B, a stylus tip touch signal results in the highest signal amplitude pattern in the vicinity of the $20^{th}$ conductive line while a signal amplitude pattern 870 and 880 in the vicinity of the $30^{th}$ conductive line corresponds to medium and low hovering respectively as described in reference to FIG. 9A. In some exemplary embodiments, dips in the hover signal may also appear.

The present inventors have found that data relating height of a stylus to a pattern of signal magnitudes across a plurality of conductive lines of the digitizer sensor may be fitted to a polynomial defining height as a function of the ratio between amplitudes of signal outputs. According to some embodiments of the present invention, height is defined as a function of a ratio between the sum of pre-determined number of largest amplitude values, e.g. four largest amplitude values, and the sum of amplitude values from all the sensor lines and/or all sensor lines in a pre-defined area. According to some embodiments of the present the ratio is defined as:

$$R = (AMP_{max1} + AMP_{max2} + AMP_{max3} + AMP_{max4}) / \Sigma AMP_i.$$

Where $(AMP_{max1}+AMP_{max2}+AMP_{max3}+AMP_{max4})$ is the sum of the four highest amplitude readings and $\Sigma AMP_i$ is the sum of all the amplitude readings.

Alternatively, a summation of all the readings sampled in a defined area around the four highest readings may be used. In some exemplary embodiments of the present invention, the relationship between the height of the stylus and the ratio is defined by polynomial:

$$Height = a*R^3 + b*R^2 + c*R + d;$$

It is noted that other polynomial functions can be defined relating height to the ratio, R.

Where the pre-defined constant coefficients of the polynomial are defined based on experimental values and saved in the system's memory. Alternatively, the pre-defined coefficients may be a function of the ratios. It is noted that although a third order polynomial is defined, other orders of polynomials may be used, e.g. second order, fourth order, or fifth order polynomial may be used.

Figure 10:
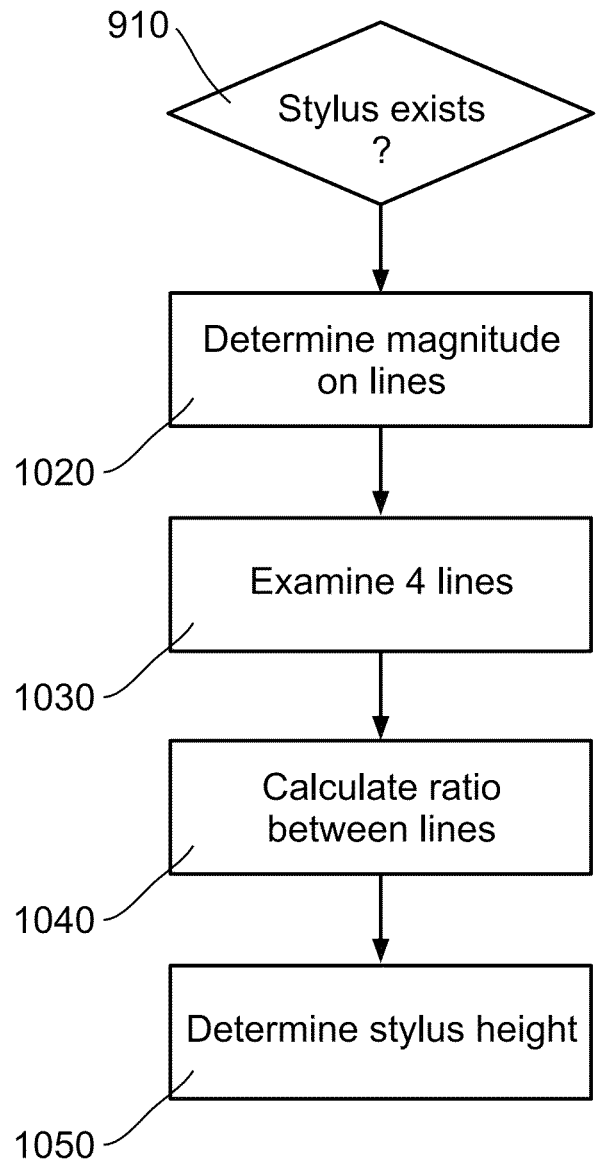
FIG. 10 shows an exemplary flow chart of a method for determining a stylus' height above a digitizer sensor from a pattern of signal magnitudes detected on the digitizer sensor in accordance with some embodiments of the present invention.

Reference is now made to FIG. 10 showing an exemplary flow chart of a method for determining a stylus' height above a digitizer sensor from a pattern of signal magnitudes detected on the digitizer sensor in accordance with some embodiments of the present invention. According to some embodiments of the present invention, for outputs indicating the presence of a stylus (block 910), signal outputs from all the conductive lines of the digitizer sensor are sampled and their amplitude is determined (block 1020). According to some embodiments, four sensor lines representing the four highest amplitude readings are selected and their values are summed (block 1030). In some exemplary embodiments, the four sensor lines selected are required to be proximal to each other, e.g. within 8 contiguous sensor lines. In some exemplary embodiments, more or fewer than four amplitude readings are used, e.g. a summation of the 3 or 5 highest readings are used. According to some embodiments of the present invention, a ratio is determined between the sum of the four highest readings and the sum of all the readings sampled (block 1040). According to some embodiments of the present invention, height of the stylus is calculated (1050) based on the pre-defined polynomial.

The present inventors have found that although the amplitude of the output signal varies as a function of the height of the stylus above the digitizer sensor, the amplitude of output signal is also a function of a stylus' position with respect to the sensor conductive lines on the digitizer sensor. For example, when the tip of the stylus is oriented and/or aligned directly over a conductive line the amplitude of the output signal is typically greater then when the tip of the stylus is aligned in between two sensor lines. According to some embodiments of the present invention, the positioning and/or alignment of the stylus with respect to the most proximal sensor lines is determined and considered when estimating the height of the stylus over the digitizer. According to some embodiments of the present invention, two different ratios are determined so that both amplitude variation due to positioning of the tip of the stylus at a distance between two sensor lines and amplitude variation due to height of the stylus above the digitizer can be considered.

Figure 11A:
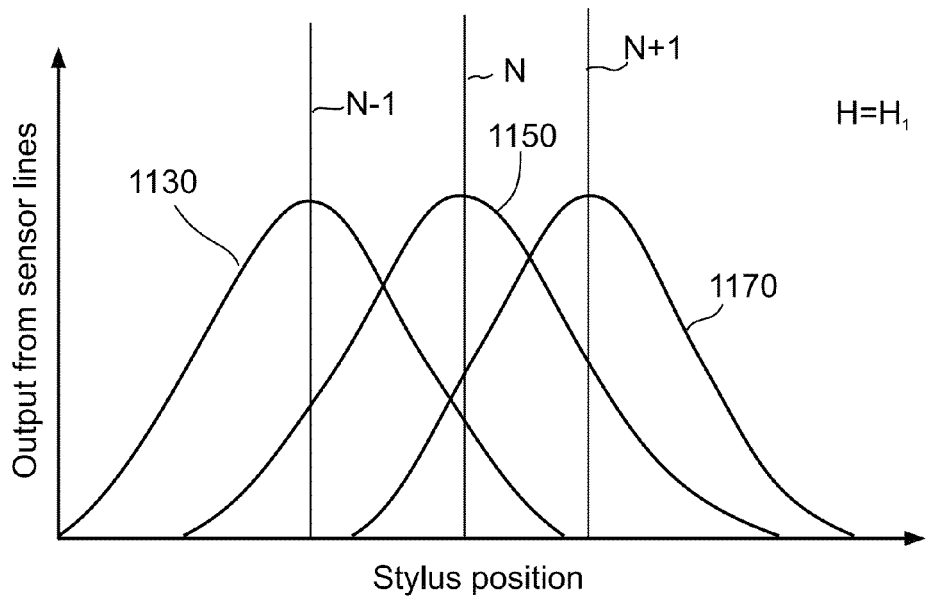
FIGS. 11A-11B show simplified graphs of exemplary outputs from three conductive lines of a sensor for different positions of the stylus along the digitizer sensor when the stylus is held at two different heights in accordance with some embodiments of the present invention.
Figure 11B:
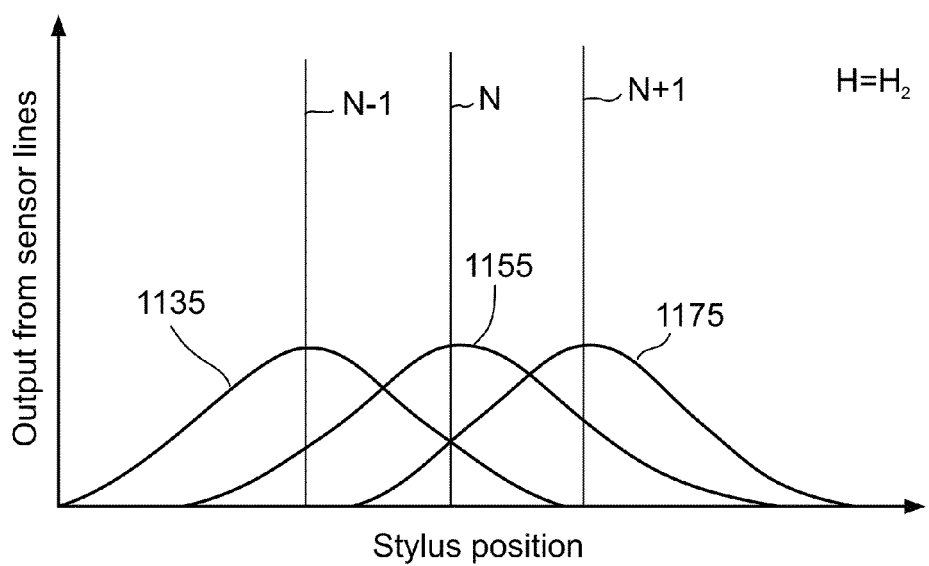

Reference is now made to FIGS. 11A-B showing simplified graphs of exemplary outputs from three conductive lines of a sensor for different positions of the stylus along the digitizer sensor when the stylus is held at two different heights in accordance with some embodiments of the present invention. In FIG. 11A, representative outputs 1130, 1150, and 1170 from three consecutive sensor lines N−1, N, and N+1 is shown. Outputs shown in FIG. 11A represent outputs obtained from a stylus positioned at a height H1 over the digitizer sensor. In FIG. 11B, representative outputs 1135, 1155, and 1175 from three consecutive sensor lines N−1, N, and N+1 is shown. Outputs shown in FIG. 11B represent outputs obtained from a stylus positioned at a height H2 over the digitizer sensor. Since both height of a stylus above the sensor surface and position of the stylus with respect to sensor line N affect the amplitude of the output, the same outputs can be obtained for a different height when the stylus is at a different distance from sensor line N. According to some embodiments of the present invention, two ratios are determined to resolve the ambiguity in height above a digitizing surface for different distances of a stylus tip from a sensor line N.

Typically, when the stylus tip is positioned directly over a sensor line N, a maximum output, 1111, is obtained from line N for a given height above the sensor and outputs 1112 from contiguous lines N−1 and N+1 may be substantially the same and lower than output 1111. As the stylus tip is distance from line N, either to the right or to the left, the output from line N decreases in a substantially symmetrical manner and output from lines N−1 and N+1 will increase or decrease depending on the distance between the stylus tip and the sensor line. For example, if the stylus is moved to position A away from line N and further away from line N−1, a lower output 1150A is obtained from line N and a lower output 1130A is obtained from line N−1. However, a higher output 1170A may be obtained from line N+1 since the stylus tip is now closer to line N+1.

As can be seen in FIG. 11B, a similar relationship between outputs of different lines exists although the amplitude of the output signal from the sensor lines at height H2 are generally lower than outputs signals from sensor lines at height H1. Typically, as the height increases, the amplitude of the output decreases so that H2 is above height H1. In some exemplary embodiments, the shapes of the curves, e.g. curves 1130-1175, may also differ for different heights, e.g. as described in reference to FIG. 8A.

According to some embodiments of the present invention, changes in amplitude variation due to positioning of the tip of the stylus at a distance between two sensor lines and amplitude variation due to height of the stylus above the digitizer is distinguished by examining two different ratios of amplitudes from three contiguous sensors, where the middle sensor line from the three exhibits the highest output in the digitizer sensor. In some exemplary embodiments, a first ratio compares amplitude output from lines N−1 and N+1 and a second ratio compares output from line N and N+1. Alternatively, the second ratio may compare output from line N and N−1. Optionally, three ratios are examined, e.g. N+1/N−1, N/N+1, and N/N−1. Optionally, the first ratio compares a sum of amplitudes from a pre-defined number of contiguous sensor lines on one side of N and a sum of amplitudes from a pre-defined number of contiguous sensor lines on the other side of N.

According to some embodiments of the present invention, the first ratio, e.g. (N+1/N−1) is most sensitive to the position of the stylus tip in between the three sensor lines. In some exemplary embodiments, a ratio that is substantially one indicates that the stylus tip is positioned directly over sensor line N, e.g. with a zero distance between sensor line N and position of the stylus tip, while a ratio that is greater than one indicates that the stylus tip is closer to N+1, and a ratio that is less than one indicates that the stylus tip is closer to sensor line N−1.

According to some embodiments of the present invention, the second ratio is most sensitive to the height of the stylus. In some exemplary embodiments, for lower heights of stylus, e.g. when stylus is near digitizer surface, difference between N and N−1 generally increases while for higher heights of the stylus, differences between N and N−1 generally decrease.

According to some embodiments of the present invention, two look up tables are saved in the digitizer system's memory. A first table charts distance of the stylus tip with respect to sensor line N as a function of the first ratio and the height of the stylus tip. According to some embodiments of the present, a second table charts distance of the stylus tip with respect to sensor line N as a function of the second ratio and a height of the stylus tip. According to some embodiments of the present invention, values from the first and second table are experimentally determined by calculating rations from detected output while positioning a stylus at different positions with respect to a sensor line and at different heights. Typically, a plurality of possible distances from sensor line N may be obtained from each of the first and second tables, each distance corresponding to a different height.

Figure 12:
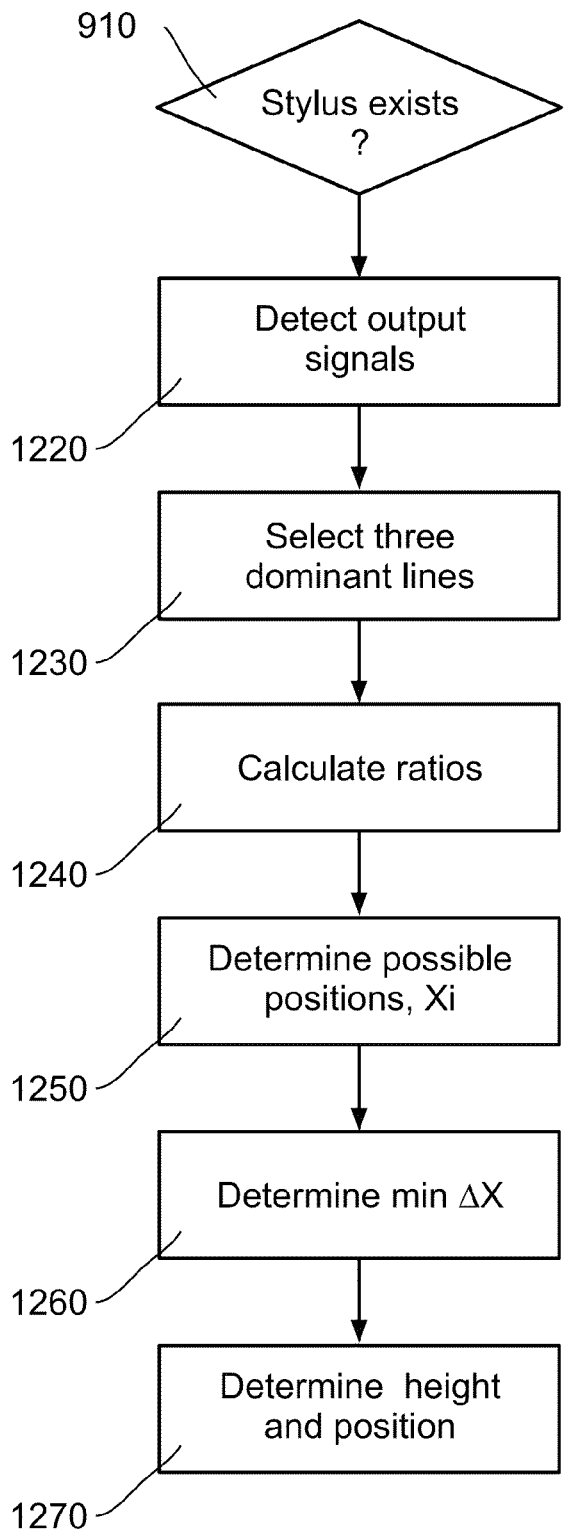
FIG. 12 shows an exemplary flow chart of a method for determining a stylus' height above a digitizer sensor and its position in relation to conductive lines on the digitizer sensor from a pattern of signal magnitudes detected on the conductive lines of digitizer sensor in accordance with some embodiments of the present invention.

Reference is now made to FIG. 12 showing an exemplary flow chart of a method for determining a stylus' height above a digitizer sensor and its position in relation to conductive lines on the digitizer sensor from a pattern of signal magnitudes detected on the conductive lines of digitizer sensor in accordance with some embodiments of the present invention. According to some embodiments of the present invention, for outputs indicating the presence of a stylus (block 910), signal outputs from all the conductive lines of the digitizer sensor are sampled and their amplitude is determined (block 1220). According to some embodiments of the present invention, three contiguous lines representing the highest amplitude signals are selected (block 1230). According to some embodiments of the present invention, two ratios are calculated from the selected lines (block 1240). In some exemplary embodiments, a first ratio between the third and first line is calculated, e.g. the two outer lines, and a second ratio between the second and first line, e.g. two contiguous lines is calculated.

According to some embodiments of the present invention, each of the two ratios is compared to a look up table to determine possible positions of the stylus over different heights (block 1250). Typically, a first set of possible positions, $x_1$ is obtained from the first ratio and a second set of possible positions, $x_2$ is obtained from the second ratio. The different possibilities correspond to different heights. According to some embodiments of the present invention, $\Delta X$ is defined for each height, where $\Delta X = |x_1 - x_2|$ and a minimum value of $\Delta X$ is selected (block 1260). According to some embodiments, the position and height that yields the lowest $\Delta X$ is determined to be the position of the stylus tip and the height of the stylus over the digitizer sensor (block 1270).

It is noted that although some embodiments of the present invention have been described in reference to identifying a hover event or state based on a pattern of amplitudes formed by the signal outputs, similar methods may be applied to detect other events occurring in other operational modes, e.g. tip touch, right mouse click emulation and erasing. According to some embodiments of the present invention, at least one of the operational modes other than hovering, e.g. tip touch, right mouse click emulation and erasing, are identified based on a pattern of amplitudes formed by the signal outputs and pre-defined frequencies associated with each of the operational modes are updated based on detected frequencies of the identified signal outputs.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for identifying that an object configured for interacting with a digitizer sensor is hovering over the digitizer sensor, the method comprising:
   triggering circuitry of the object with a triggering signal to produce a response from the object;
   detecting the presence of the object in the vicinity of the digitizer sensor from the response of the object as detected from a peak formed by signal outputs obtained from a plurality of sensing elements of the digitizer sensor, wherein each of the plurality of sensing elements is associated with a different area on the digitizer sensor;
   identifying at least one sensing element providing a highest amplitude signal output from the plurality of sensing elements;
   characterizing a width of the peak with at least one ratio between amplitude of signal output from the at least one sensing element identified and amplitude of signal output from at least one other sensing element and with a defined distance between the at least one sensing element and the at least one other sensing element; and
   identifying that the object is hovering based on the characterization of the width by comparing the at least one ratio to a threshold level for hovering, the threshold level associated with the defined distance between the sensing elements.

2. The method according to claim 1, comprising:
   determining frequency content of a hovering signal obtained from the at least one sensing element over a plurality of cycles of sampling the digitizer sensor outputs;
   determining an extent of variations in the frequency content of the hovering signal over the plurality of cycles; and
   identifying hovering below the pre-defined maximum height of the object when the extent of the variations determined is less than a pre-defined threshold.

3. The method according to claim 1, comprising:
   determining frequency of the signal outputs during hovering; and
   matching the triggering frequency of the triggering signal to the determined frequency for hovering.

4. The method according to claim 3 comprising:
   defining a frequency for identifying each of a plurality of operational modes; and
   updating the frequency defined for identifying at least one operational mode, other than the hover operational mode, based on the determined frequency of the hovering operational mode.

5. The method according to claim 1, wherein the at least one ratio is a ratio between a highest amplitude signal output obtained from a first sensing element on the digitizer sensor and an amplitude obtained from signal output of a second sensing element contiguous to the first sensing element.

6. The method according to claim 1 comprising determining a height of the object above the digitizer sensor based on a pattern formed from amplitudes obtained from different sensing elements from the response produced by the object in response to the same triggering signal and comparing the pattern to a pattern associated with a defined height of the object.

7. The method according to claim 6 wherein the height determined is a qualitative height.

8. The method according to claim 7 wherein the qualitative measure for height includes low hovering, medium hovering and high hovering of the object.

9. The method according to claim 1, comprising determining a height of the object above the digitizer sensor, wherein the height is a function of the at least one ratio and pre-defined coefficients.

10. The method according to claim 1 comprising:
   determining at least two ratios between amplitudes formed by the signal outputs from different pairs of sensing elements, wherein the signal outputs are obtained from the response produced by the object in response to the same triggering signal; and
   resolving ambiguity of the height of the object above the digitizer sensor by comparing the at least two ratios.

11. The method according to claim 1, wherein the object is selected from a group including: stylus, token, and game piece.

12. The method according to claim 1, wherein the object interacts with the digitizer sensor in a plurality of operational modes.

13. The method according to claim 12, wherein the plurality of operational modes includes at least one of hovering operation mode, object touching operational mode, right mouse click emulation, and erasing.

14. The method according to claim 1, wherein the object includes a passive resonant circuit configured to transmit a signal in response to a triggering pulse.

15. The method according to claim 14, wherein the resonant circuit is configured for resonating at a different frequency for each operational mode.

16. The method according claim 1, wherein the object includes a resonant circuit and at least one capacitor connected in parallel to the resonant circuit via a user controllable switch, and wherein an operational mode of the object is selected by activating the switch.

17. The method according to claim 1 wherein the object is a pressure sensitive stylus sensitive to pressure applied to a tip of the stylus.

18. The method according to claim 17, wherein the pressure sensitive stylus includes a resonant circuit, wherein the resonant circuit includes a variable element and wherein the element is varied in response to varying pressure applied on the tip of the stylus.

19. The method according to claim 1, wherein the sensing elements include a grid of conductive lines.

* * * * *